US012772062B2

(12) United States Patent
Singh et al.

(10) Patent No.: US 12,772,062 B2
(45) **Date of Patent: *Oct. 20, 2026**

(54) LONG-TERM PATTERN RECOGNITION USING PROXIMITY DETECTION FOR SECURITY APPLICATIONS

(71) Applicant: Dell Products L.P., Round Rock, TX (US)

(72) Inventors: Tejinder Singh, Manotick (CA); Navjot Kaur Khaira, Manotick (CA); Kan Wang, Ottawa (CA); Ibrahim Abu Alhaol, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 19/056,466

(22) Filed: Feb. 18, 2025

(65) Prior Publication Data

US 2026/0247156 A1 Aug. 20, 2026

(51) Int. Cl.
*H04W 12/68* (2021.01)
*H04W 12/06* (2021.01)

(52) U.S. Cl.
CPC .......... *H04W 12/68* (2021.01); *H04W 12/06* (2013.01)

(58) Field of Classification Search
CPC .............................. H04W 12/68; H04W 12/06
See application file for complete search history.

(56) References Cited

U.S. PATENT DOCUMENTS 2,648,839 A 8/1953 Ford et al.
2,894,261 A 7/1959 Yaru (Continued)

FOREIGN PATENT DOCUMENTS

CN 114168014 A 3/2022
CN 117044035 11/2023
EP 2495621 9/2012

OTHER PUBLICATIONS

"Introducing the New Oura Ring Generation 3" Oura. [https://ouraring.com/blog/oura-generation2-vs-generation3/], retrieved Jul. 3, 2025, 3 pages.

(Continued)

*Primary Examiner* — Sarah Su
*Assistant Examiner* — Kelah Janae McFarland-Barnes
(74) *Attorney, Agent, or Firm* — Amin, Turocy & Watson, LLP

(57) ABSTRACT

The technology described herein is directed towards using a wearable passive metasurface (e.g., configured as a ring) to reflect signals representative of user interaction with computer peripheral devices (e.g., a mouse and keyboard) coupled to a computing device. The reflected signals indicate current user interaction with the device obtained over a timeframe. A short term classifier model set processes features of the user interaction patterns, extracted from time and frequency domain analyses, to recognize activity from the interaction pattern data of a user, as well as detect any deviations from the user's ordinary interaction behavior, possibly indicating a different user. A long term classification model inputs the user interaction pattern data and the recognized activity, to output authentication response data, such as confidence level data, for comparison with a confidence level threshold, to determine via the interaction pattern data whether the user is an authorized user of the computing device.

20 Claims, 18 Drawing Sheets

(56) References Cited

U.S. PATENT DOCUMENTS

| | | | |
|---|---|---|---|
| 2,981,949 | A | 4/1961 | Elliott |
| 3,218,644 | A | 11/1965 | Berry |
| 3,308,467 | A | 3/1967 | Morrison, Jr. |
| 4,518,967 | A | 5/1985 | Westerman |
| 5,579,019 | A | 11/1996 | Uematsu et al. |
| 10,038,690 | B2 | 7/2018 | Andrews et al. |
| 10,193,880 | B1 | 1/2019 | Jiang et al. |
| 10,497,227 | B2 | 12/2019 | Bilal et al. |
| 10,701,067 | B1 | 6/2020 | Ziraknejad et al. |
| 11,042,613 | B2 | 6/2021 | Deole et al. |
| 11,074,488 | B2 | 7/2021 | Klimt |
| 11,340,392 | B1 | 5/2022 | Wollack et al. |
| 11,393,037 | B1 | 7/2022 | Fields et al. |
| 11,461,687 | B1 | 10/2022 | Shaikh et al. |
| 11,757,165 | B2 | 9/2023 | Shi |
| 11,949,673 | B1 * | 4/2024 | Sanchez .................. G06F 1/163 |
| 12,225,026 | B1 * | 2/2025 | Zhou ................... H04L 63/1416 |
| 12,260,077 | B1 * | 3/2025 | V ........................ G06F 3/04845 |
| 12,361,254 | B1 | 7/2025 | Singh et al. |
| 12,407,681 | B2 | 9/2025 | Young et al. |
| 2001/0017603 | A1 | 8/2001 | Teshirogi et al. |
| 2003/0098815 | A1 | 5/2003 | Teshirogi et al. |
| 2005/0038994 | A1 | 2/2005 | Johnson et al. |
| 2006/0097942 | A1 | 5/2006 | Tanaka et al. |
| 2007/0091004 | A1 | 4/2007 | Puuri |
| 2011/0209372 | A1 | 9/2011 | Padgett et al. |
| 2012/0056776 | A1 | 3/2012 | Shijo et al. |
| 2012/0306711 | A1 | 12/2012 | Asplund et al. |
| 2015/0035643 | A1 | 2/2015 | Kursun |
| 2015/0109106 | A1 | 4/2015 | Gomez et al. |
| 2015/0147065 | A1 | 5/2015 | Civelli et al. |
| 2015/0222023 | A1 | 8/2015 | Shijo et al. |
| 2016/0028715 | A1 | 1/2016 | Sivashanmugam et al. |
| 2016/0254396 | A1 | 9/2016 | Casse |
| 2019/0132399 | A1 | 5/2019 | Henning et al. |
| 2019/0379120 | A1 | 12/2019 | Manasson et al. |
| 2020/0005113 | A1 * | 1/2020 | Schnippering ... G06K 19/07777 |
| 2020/0012912 | A1 | 1/2020 | Klimt |
| 2020/0042977 | A1 | 2/2020 | Boulby |
| 2020/0294642 | A1 | 9/2020 | Bostic et al. |
| 2020/0403647 | A1 | 12/2020 | Bit-Babik et al. |
| 2021/0028528 | A1 | 1/2021 | Alexanian et al. |
| 2021/0258314 | A1 | 8/2021 | Tabaja |
| 2022/0012336 | A1 | 1/2022 | Lakkundi et al. |
| 2022/0078762 | A1 | 3/2022 | Machado et al. |
| 2022/0085841 | A1 | 3/2022 | Grétarsson et al. |
| 2022/0413587 | A1 | 12/2022 | Lagnado et al. |
| 2023/0155812 | A1 | 5/2023 | Bennison |
| 2023/0344136 | A1 | 10/2023 | Liu et al. |
| 2023/0386245 | A1 | 11/2023 | Tada |
| 2024/0214967 | A1 | 6/2024 | Zorgui et al. |
| 2024/0248366 | A1 | 7/2024 | Cho et al. |
| 2024/0250445 | A1 | 7/2024 | Sano |
| 2024/0310561 | A1 | 9/2024 | Allen et al. |
| 2024/0387998 | A1 | 11/2024 | Wong et al. |
| 2024/0393433 | A1 | 11/2024 | Elian et al. |
| 2024/0402342 | A1 | 12/2024 | Knapp et al. |
| 2024/0406752 | A1 | 12/2024 | Coskun et al. |
| 2025/0078593 | A1 | 3/2025 | Beuchat et al. |
| 2025/0309943 | A1 | 10/2025 | Elshafie et al. |
| 2025/0372886 | A1 | 12/2025 | Wada et al. |
| 2026/0023831 | A1 | 1/2026 | Singh et al. |
| 2026/0024921 | A1 | 1/2026 | Singh et al. |
| 2026/0025156 | A1 | 1/2026 | Singh et al. |
| 2026/0025158 | A1 * | 1/2026 | Singh ..................... H04B 1/385 |
| 2026/0025159 | A1 | 1/2026 | Singh et al. |
| 2026/0025160 | A1 | 1/2026 | Singh et al. |
| 2026/0025161 | A1 | 1/2026 | Singh et al. |
| 2026/0025172 | A1 | 1/2026 | Singh et al. |
| 2026/0025199 | A1 | 1/2026 | Singh et al. |
| 2026/0025200 | A1 | 1/2026 | Singh et al. |
| 2026/0025655 | A1 | 1/2026 | Singh et al. |
| 2026/0025761 | A1 | 1/2026 | Singh et al. |

OTHER PUBLICATIONS

"Galaxy Ring—Galaxy AI is here" Samsung. [https://www.samsung.com/us/rings/galaxy-ring/?msockid=2bb734e76e306246380e20d36f0b63d2], retrieved Jul. 3, 2025, 19 pages.

Singh, et al. "Utilizing Passive Wearable Devices to Capture Device Interaction Data for Supplementary Authentication" U.S. Appl. No. 19/030,562, filed Jan. 17, 2025, 53 pages.

Singh, et al. "User Authentication in Computer Devices Through Statistical Analysis of Gesture Data" U.S. Appl. No. 19/170,829, filed Apr. 4, 2025, 40 pages.

Notice of Allowance received for U.S. Appl. No. 18/780,245 dated Mar. 21, 2025 25 pages.

Non-Final Office Action received for U.S. Appl. No. 18/775,968 dated Dec. 10, 2025, 34 pages.

Non-Final Office Action received for U.S. Appl. No. 18/775,984 dated Dec. 10, 2025, 28 pages.

Notice of Allowance received for U.S. Appl. No. 18/776,007 dated Oct. 21, 2025, 43 pages.

Notice of Allowance received for U.S. Appl. No. 18/776,018 dated Oct. 24, 2025 40 pages.

Notice of Allowance received for U.S. Appl. No. 18/775,968 dated Apr. 7, 2026, 6 pages.

Notice of Allowance received for U.S. Appl. No. 18/775,984 dated Mar. 25, 2026, 6 pages.

Non-Final Office Action received for U.S. Appl. No. 18/775,993 dated Jan. 28, 2026, 18 pages.

Non-Final Office Action received for U.S. Appl. No. 18/775,999 dated Mar. 23, 2026, 36 pages.

Non-Final Office Action received for U.S. Appl. No. 18/780,280 dated Mar. 11, 2026, 12 pages.

Notice of Allowance mailed Jun. 24, 2026 for U.S. Appl. No. 18/775,993, 48 pages.

Office Action mailed Jun. 29, 2026 for U.S. Appl. No. 18/776,011, 68 pages.

Notice of Allowance mailed Jul. 2, 2026 for U.S. Appl. No. 18/780,280, 85 pages.

Notice of Allowance mailed Jun. 30, 2026 for U.S. Appl. No. 19/030,562, 43 pages.

Ohtsuki, T. and Kamai, H., Sep. 2016. "Biometric authentication using hand movement information from wrist-worn PPG sensors". In 2016 IEEE 27th Annual International Symposium on Personal, Indoor, and Mobile Radio Communications (PIMRC) (pp. 1-5). IEEE. (Year: 2016).

Corrected Notice of Allowability mailed May 6, 2026 for U.S. Appl. No. 18/775,968, 41 pages.

Notice of Allowance mailed Jul. 16, 2026 for U.S. Appl. No. 18/780,263, 50 pages.

Notice of Allowance mailed Jul. 7, 2026 for U.S. Appl. No. 19/170,829, 86 pages.

Cao, H., Liu, D., Jiang, H., Wang, R., Chen, Z. and Xiong, J., 2023. "LIPAuth: Hand-dependent light intensity patterns for resilient user authentication". ACM Transactions on Sensor Networks, 19(3), pp. 1-29. (Year: 2023).

* cited by examiner

LONG-TERM PATTERN RECOGNITION USING PROXIMITY DETECTION FOR SECURITY APPLICATIONS

RELATED APPLICATION

The subject patent application is related to U.S. patent application Ser. No. 19/030,562, filed Jan. 17, 2025, and entitled "UTILIZING PASSIVE WEARABLE DEVICES TO CAPTURE DEVICE INTERACTION DATA FOR SUPPLEMENTARY AUTHENTICATION", the entirety of which patent application is hereby incorporated by reference herein.

BACKGROUND

Existing wearable devices (e.g., rings) focus on health and activity monitoring. Such wearable devices rely on establishing a BLUETOOTH communication link with a computing device, such as a personal computer or cellphone. These wearable devices tend to be heavy and thick due to the inclusion of sensors and other components, and in general are expensive because of high manufacturing costs.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
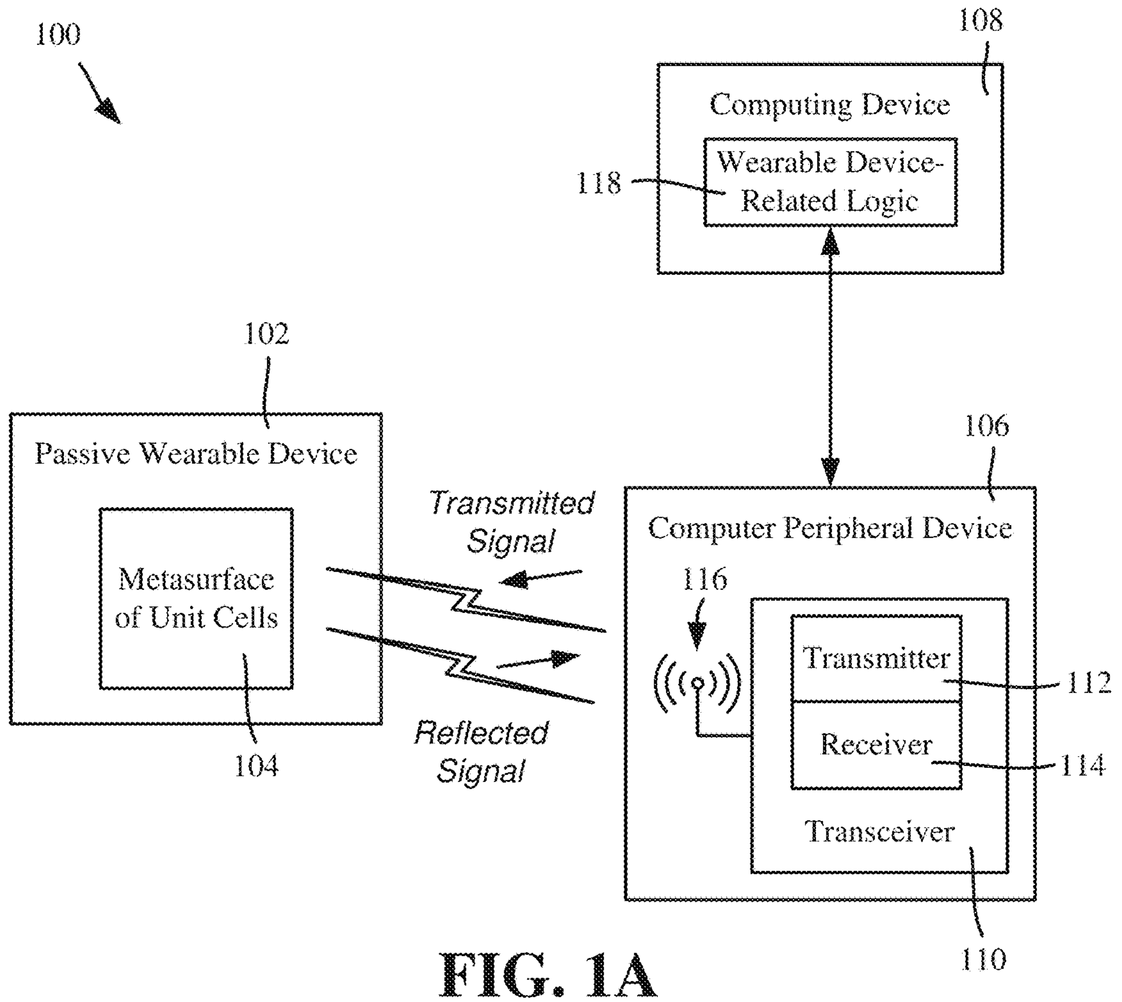
FIG. 1A is a block diagram representation of an example wearable device including a passive metasurface communicating with a computing device via a transceiver embedded in a computer peripheral device, in accordance with various example embodiments and implementations of the subject disclosure.

The technology described herein is generally directed towards detecting user interaction with computer peripheral devices (e.g., a mouse and keyboard) coupled to a computing device, via a wearable metasurface, such as in the form of a ring, that reflects transmitted signals to the computing device. The reflected signals, during times of user interaction with a computer peripheral device/the computing device, provide current user interaction pattern data (user activity profile data/gesture data) that facilitate the non-intrusive evaluation of current user interaction data. The current user interaction pattern data is based on raw signal input data captured over a recent timeframe, and is classified, e.g., via a short-term classification model, into user behavior/activity data, that is, the short-term classification model processes the data to identify the user's immediate activities, such as typing (keyboard) interaction, pointing device interaction, attending a meeting, or resting. The classification is thus typically a multi-class process, although the classifier can also perform binary classification depending on a given application.

The current user interaction pattern data, (at least some of the data), along with the short-term classification results of the current user activity, are input into a long-term classification model. The long-term classification model computes authentication response data, e.g., confidence level data for user authorization (or not) by analyzing the current user behavior, (possibly including additional user interaction pattern data captured over a longer time period), and comparing the user interaction pattern data with prior (known) behavior patterns of the authorized user. The confidence level data is based on how well the user's current behavior data aligns with stored pattern data of the authorized user, whereby a decision whether to authorize access can be made based on whether the returned confidence level data satisfies defined threshold confidence level data set for authentication.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A is a block diagram representation of one example implementation of a system 100 in which a wearable device 102, which includes a metasurface of unit cells 104, communicates with a computer peripheral (device) 106 coupled to a computing device 108. In the example of FIG. 1A, the computer peripheral device 106 includes an embedded, integrated or otherwise internal transceiver 110, which in turn includes a transmitter 112 and receiver 114. The transceiver components are coupled to an antenna 116 that transmits signals to the metasurface 104 of the passive wearable device 102, which as described herein, alters a redirected instance of the signal's characteristics reflected to the transceiver's receiver 114. Based on the received signal, wearable device-related logic 118 (e.g., a hardware or software program running in the computing device 108) can analyze the reflected signal and take some action based thereon as described herein, such as to wake the operating system program or the like for execution in the computing device. It is also feasible for the computer peripheral device 106 to include the wearable device-related logic 118, or the wearable device-related logic 118 can be divided between the computer peripheral device 106 and the computing device 108.

Figure 1B:
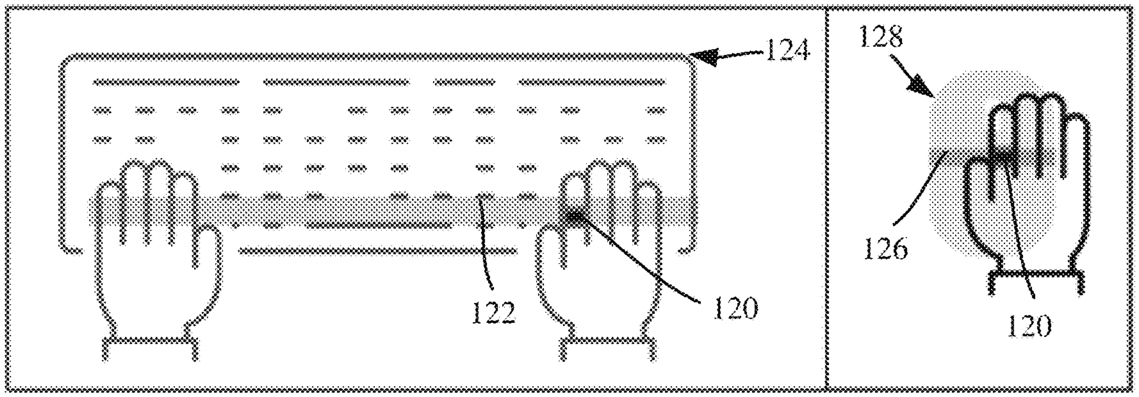
FIG. 1B is a representation of example computer peripheral devices (keyboard and/or mouse that includes a transceiver for communicating with a metasurface, in accordance with various example embodiments and implementations of the subject disclosure.
Figure 2:
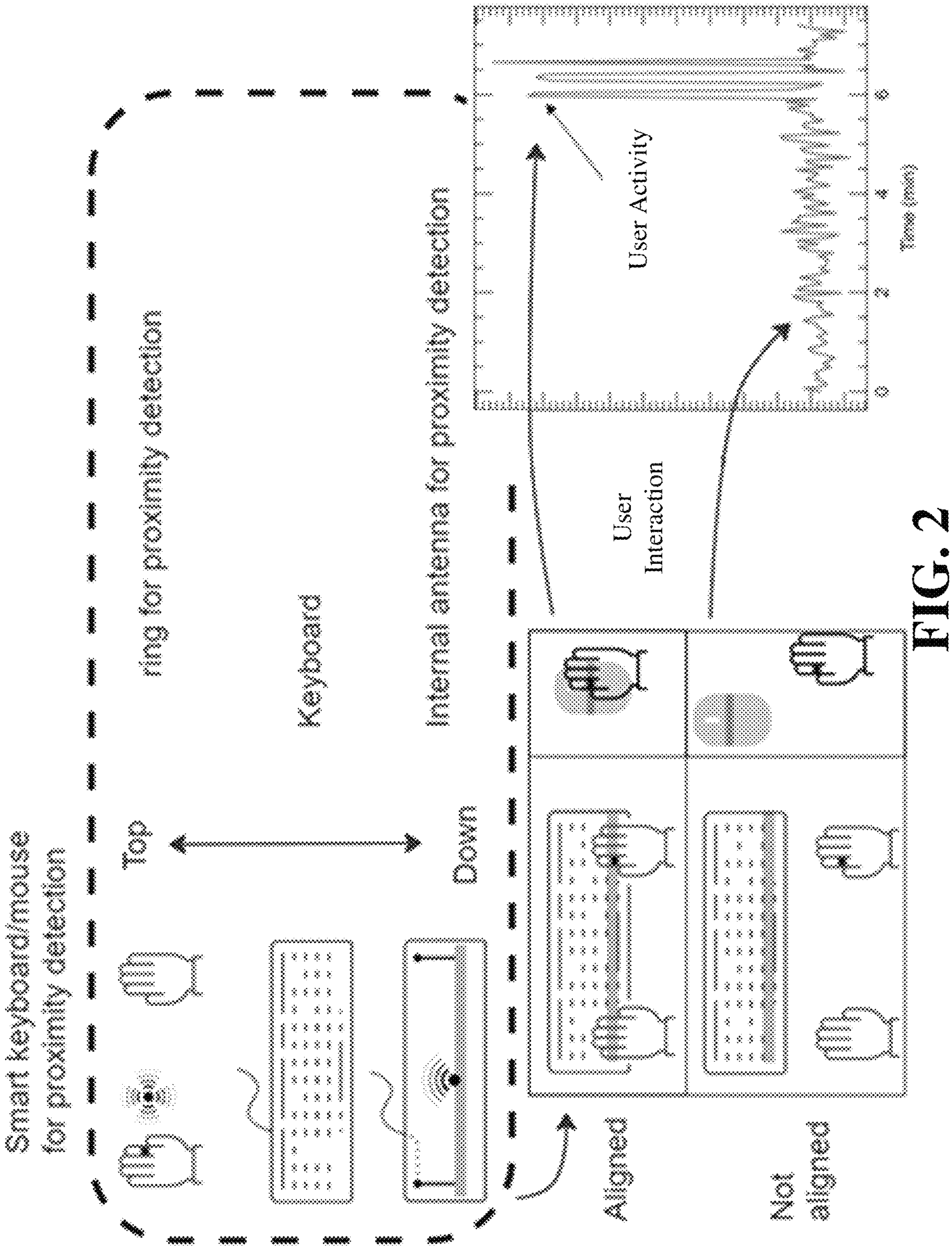
FIG. 2 is a representation of an example wearable device in the form of a ring design, in which the wearable device detects user interaction activity data, in accordance with various example embodiments and implementations of the subject disclosure.

FIGS. 1B and 2 show the general concept of a wearable ring 120 with a metasurface interacting with a peripheral device 124 or 128. The ring-based wearable metasurface 120 can act as a key to lock and unlock a computer, for example, or at least detect the user's presence to wake the computer, such as to automatically open present an interactive lock screen when proximity is detected.

More particularly, FIG. 1B shows the concept of an example ring 120 with a metasurface that couples to a transceiver/antenna 122 incorporated into a keyboard 124. Alternatively, or in addition to the transceiver/antenna 122 incorporated into the keyboard 124, a transceiver/antenna 126 can be incorporated into a mouse 128 or other pointing device.

FIG. 2 shows ways in which the transceiver (with antennas) can be embedded into computing device peripherals like a keyboard and a mouse. For users wearing a metasurface on a ring, hand movements, key presses, and mouse actions can be captured, for model training and subsequent analysis. The transceiver's antenna sends monitoring signals, which are reflected by the metasurface on the ring and registered by the system. The transceiver can be designed to be a native part of the device peripherals, ensuring seamless interaction and monitoring.

To summarize, the operation is based on having a receiver coupled to or incorporated into a computing device, e.g., as a native part of the computing device, or as an auxiliary USB or added card coupled to the computing device. A transmitter, which can be a transceiver that also receives the signal, transmits a wireless scanning signal, which in the presence of the metasurface is reflected back to the receiver, whereby the presence of the metasurface (and thus the user wearing the metasurface) is detected. In one implementation, the use of sub-terahertz range communication ensures that the metasurface remains compact, and that the system only detects the metasurface when the metasurface is in close proximity to the computing device, preventing unauthorized access from a distance. The wearable metasurface ring thus has the potential to act as a replacement for existing user authentication processes and as an aid to enhance current systems, e.g., offering a seamless and secure method for authentication that can be more convenient and less obtrusive than traditional methods like passwords, PINs, or biometric scans.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users' respective computing devices can have respective external or internal receivers.

Figure 3:
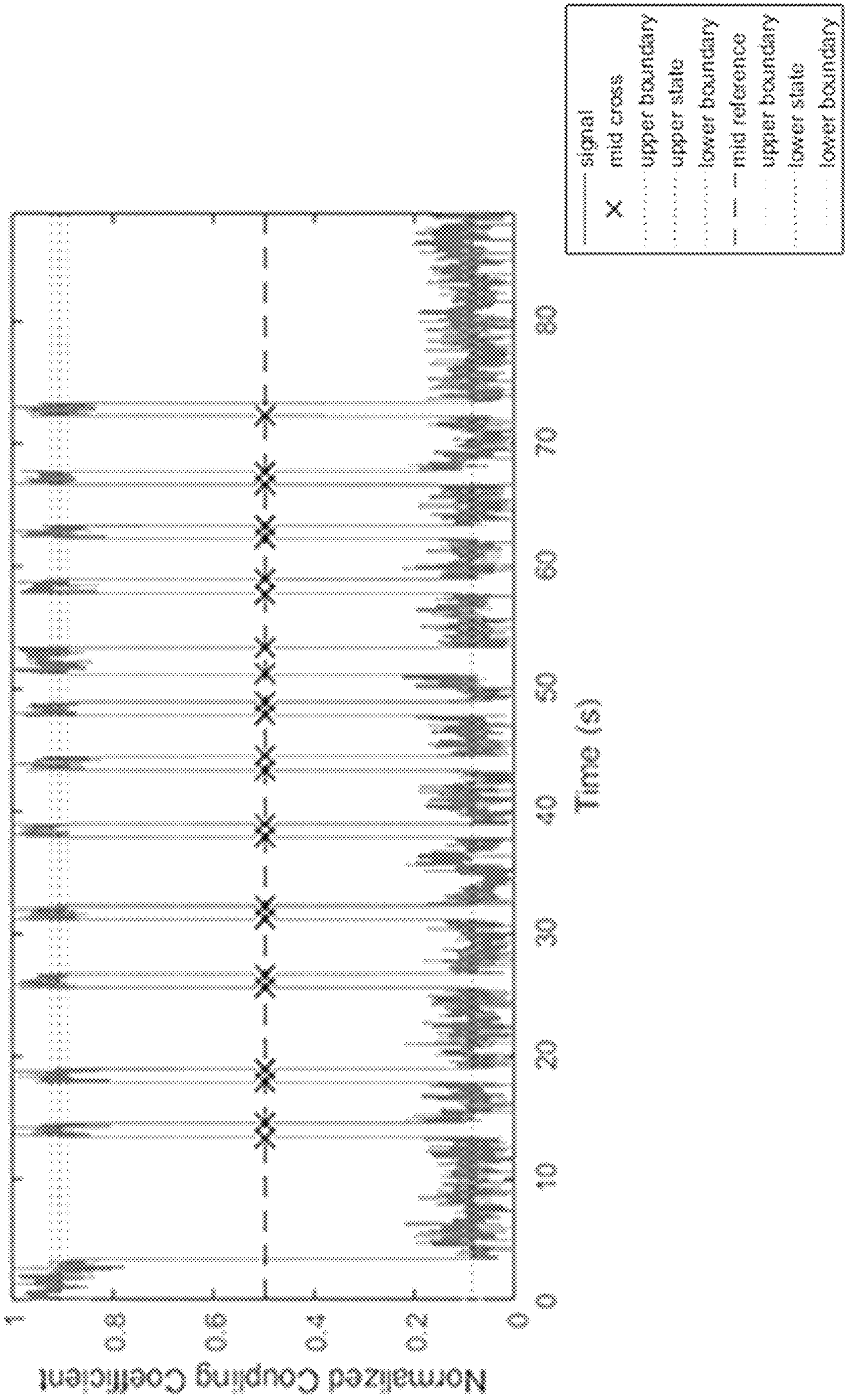
FIG. 3 is an example representation of a captured time domain spectrum corresponding to detected user interaction data of a first user (User-A), in accordance with various example embodiments and implementations of the subject disclosure.

FIGS. 3-6 are graphical representations of captured user interaction pattern data for two different users, User A (FIGS. 3 and 5) and User B (FIGS. 4 and 6), engaging in two distinct activities. The data shown in FIG. 3 is user interaction pattern data in the time domain for the User A, while the data shown in FIG. 4 corresponds to User B's user interaction pattern data in the time domain. Despite the two users performing different activities, the resulting spectrum response exhibits a high degree of similarity.

Figure 5:
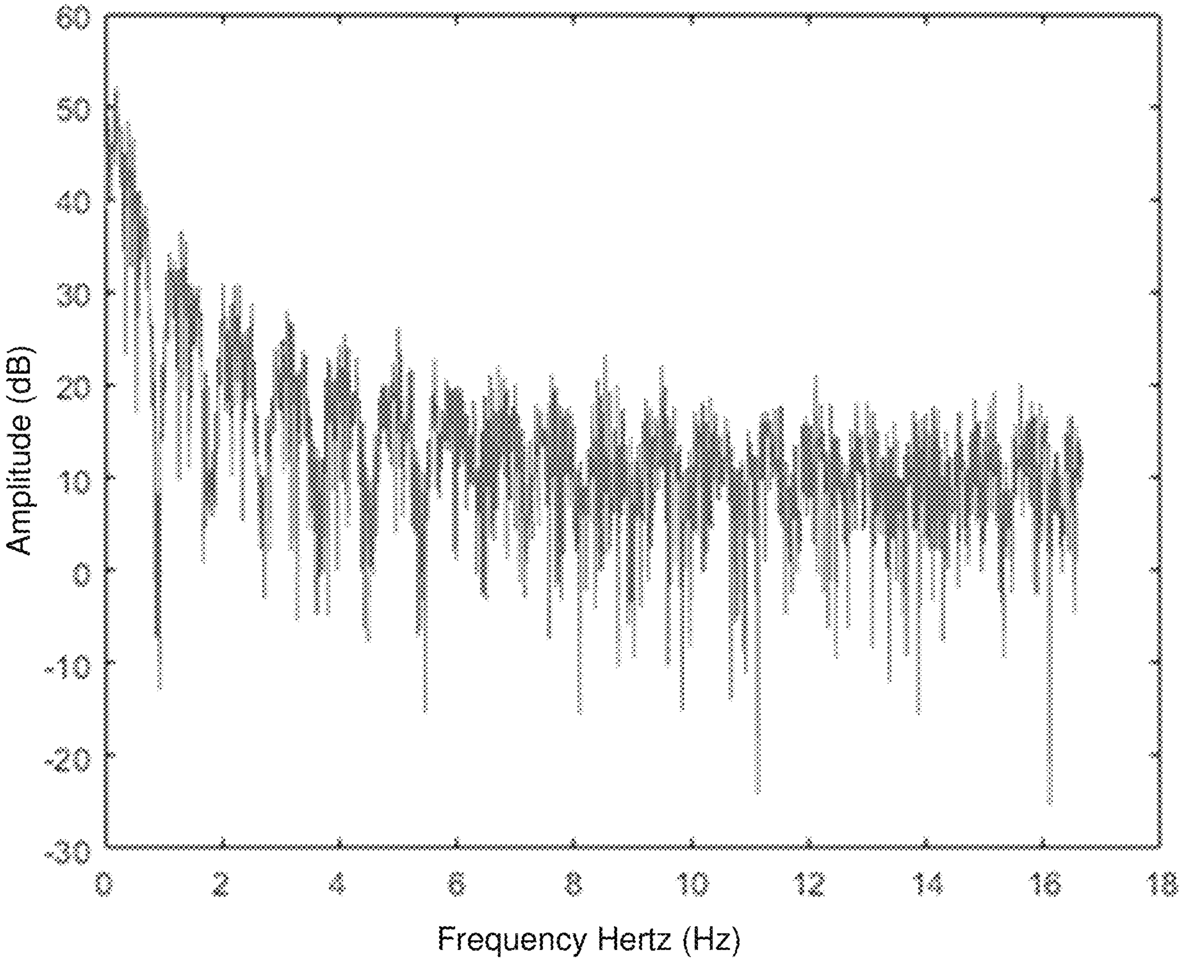
FIG. 5 is an example representation of frequency domain spectrum corresponding to the detected user interaction data of the first user (User-A), in accordance with various example embodiments and implementations of the subject disclosure.

More particularly, the data shown in FIG. 3 and FIG. 5 are the normalized coupling coefficient over time for User A and User B, respectively. Both of the graphs of FIGS. 3 and 5 display similar patterns, with distinct mid-cross points, upper and lower boundaries, and consistent oscillations between the upper and lower states. Although the specific activities performed by User A and User B are different, the time-domain signals suggest a consistent interaction with the system. Further, while the mid-reference and boundary markers help in identifying the transitions between different states, both users' patterns are nearly indistinguishable.

Figure 4:
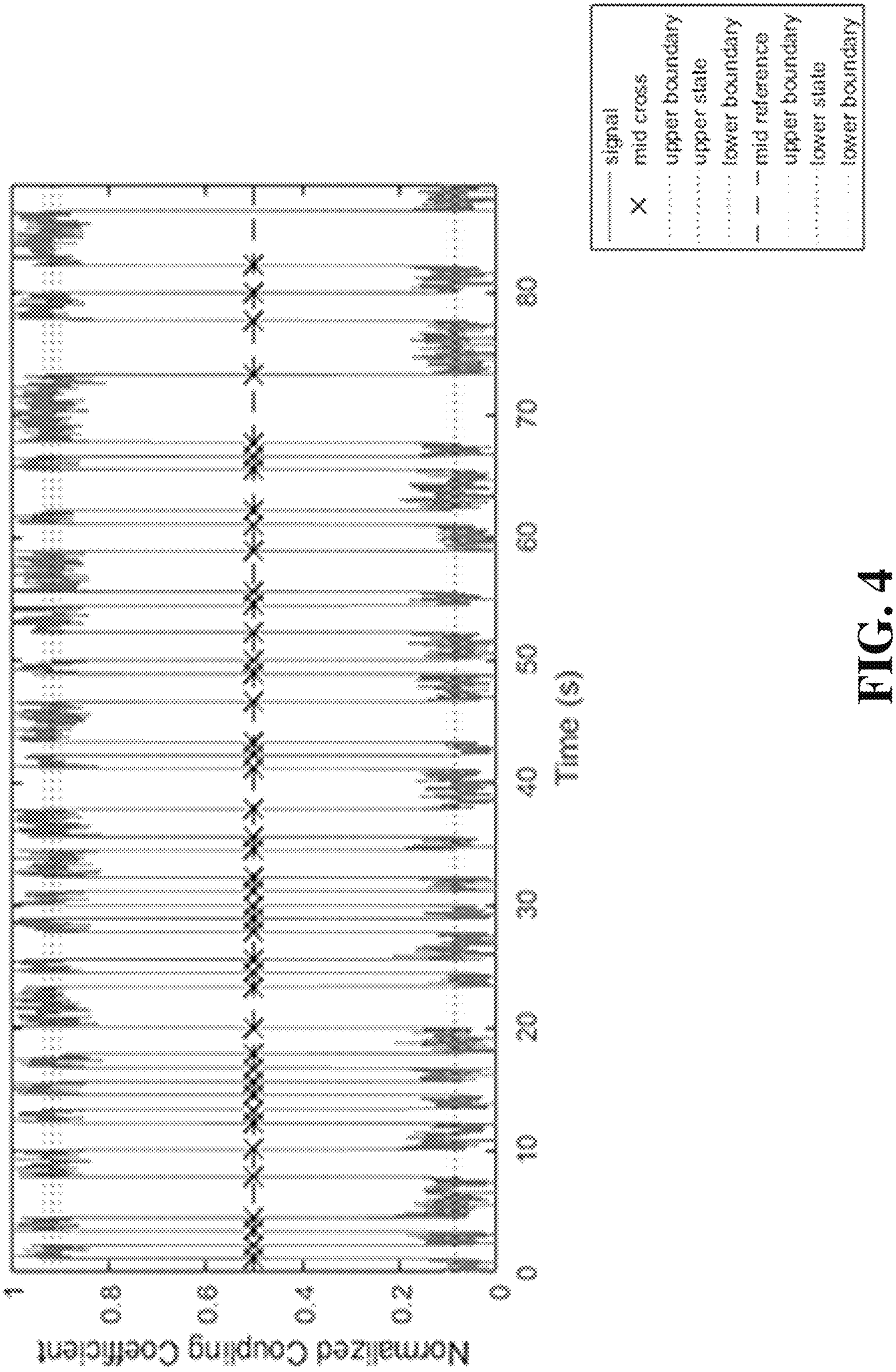
FIG. 4 is an example representation of a captured time domain spectrum corresponding to detected user interaction data of a second user (User-B), in accordance with various example embodiments and implementations of the subject disclosure.
Figure 6:
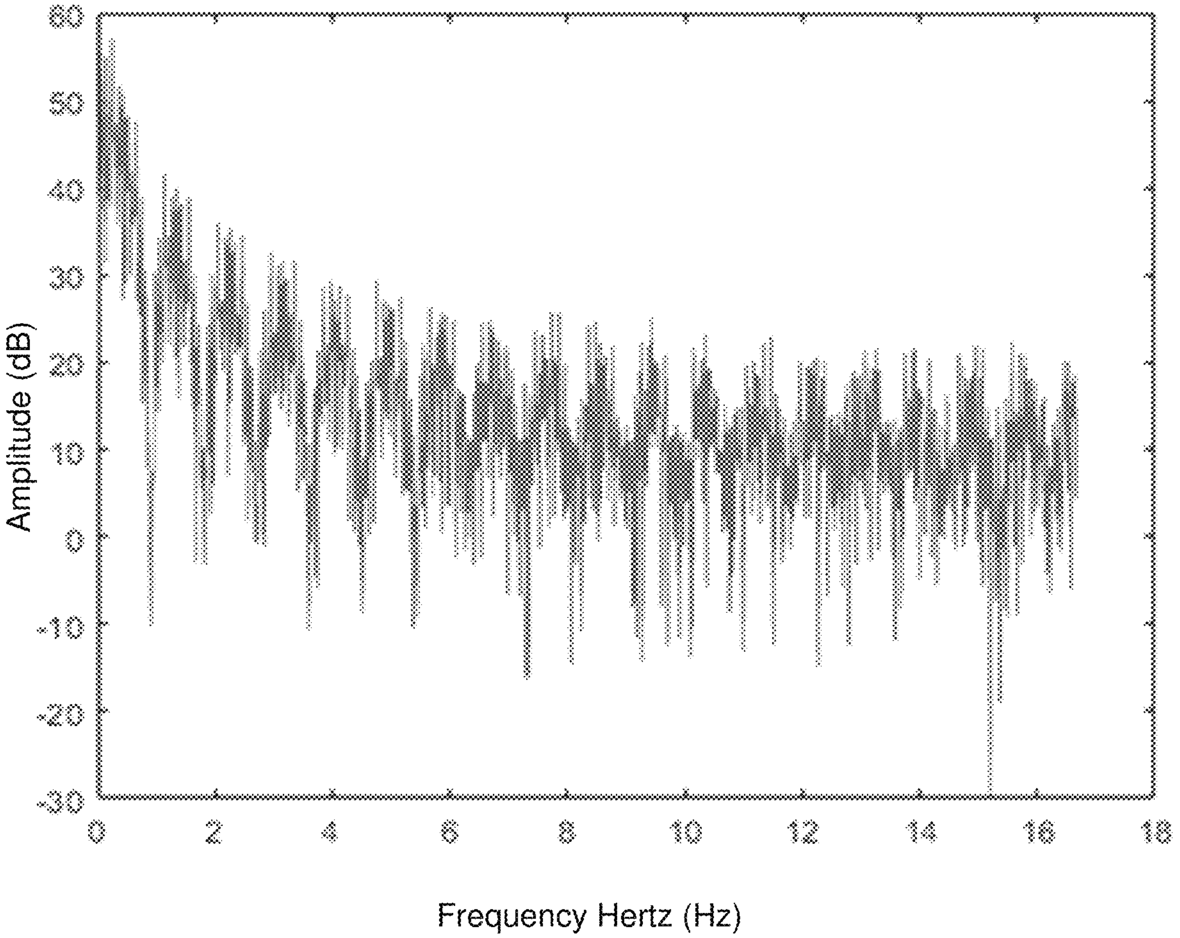
FIG. 6 is an example representation of frequency domain spectrum corresponding to the detected user interaction data of the second user (User-B), in accordance with various example embodiments and implementations of the subject disclosure.

The data shown in FIGS. 4 and 6 represent frequency-domain analysis of the interaction-related using Fast Fourier Transform (FFT) for User A and User B, respectively. The FFT converts the time-domain signal into its frequency components, revealing how the energy of the signal is distributed across various frequencies. Similar to the time-domain analysis, the frequency-domain signals for User A and User B show comparable spectral characteristics. The energy levels decrease as the frequency increases, and the overall shape of the spectrum is consistent between the two users, indicating that the frequency response is similar even though the users were engaged in different activities. Notwithstanding the similarities, differences are discernable.

Figure 7:
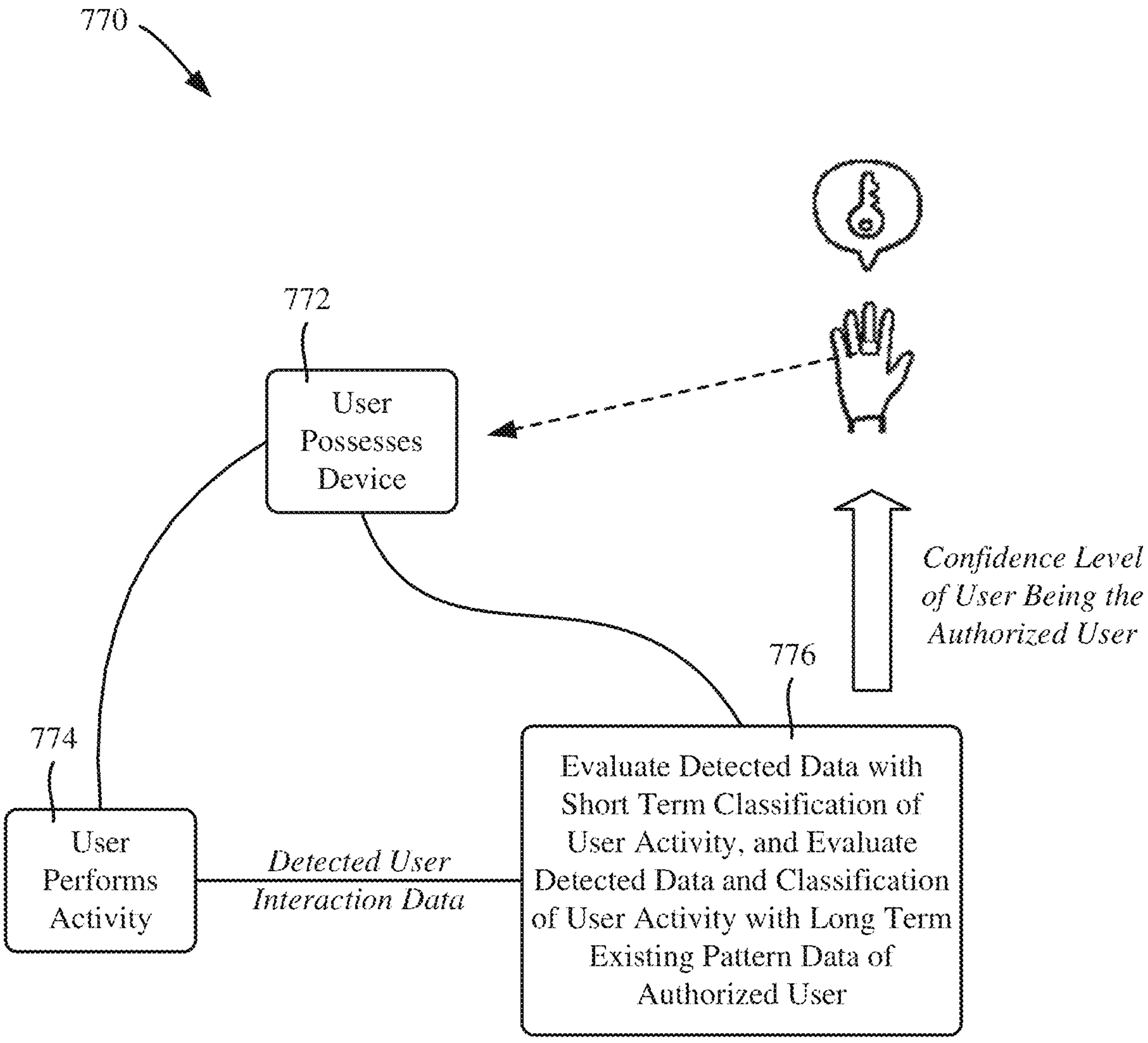
FIG. 7 is a representation of user authentication based on implied user behavior pattern data, without explicit user authentication input, for security using three example factors, in accordance with various example embodiments and implementations of the subject disclosure.

FIG. 7 generally represents a multi-factor authentication framework 770 based on three example elements, or factors. Each factor represents a different component of user authentication, contributing to a robust security system. More particularly, a first factor (represented in FIG. 7 by block 772) is based on possession of a manufactured ring or other a passive wearable metasurface that can have a unique signature, e.g., the unit cells of one such metasurface are fabricated to reflect signals with characteristics that are detectably distinct from the reflected signals of any other metasurface. In this example, the ring serves as a physical token that the user has to possess to authenticate his or her identity. The metasurface/ring is thus an external object that is specifically designed and linked to the authorized user, making possession of the device a first element in verifying the user's identity.

A second factor (represented by block 774) involves the user's current activity, such as typing, resting, or other behavior patterns. The system monitors and classifies these activities in real-time using short-term pattern recognition. As described herein the activity classified from the current user interaction pattern data operates as a behavioral signature that helps in identifying the user. The system recognizes that the way a person interacts with the environment, such as by typing rhythm or movement patterns, can be unique and indicative of their identity.

A third factor (represented by block 776) pertains to the previously obtained knowledge of the short-term pattern of the authorized user. The system has learned and stored these short-term pattern data based on the user's previous behaviors with respect to the classified type of activity, and uses this knowledge to authenticate the user. By comparing the current activity with known patterns of a user, via a long term classification model set, the system can determine whether the behavior matches that of an authorized user of the computing device. In one implementation, the long term model set outputs authentication response data in the form of confidence level data, which can be evaluated to determine whether the returned confidence level data satisfies defined confidence level threshold data. Note that the defined threshold confidence level data can be determined based on external conditions or other factors, e.g., a lower threshold can be set if the user is known to be interacting with the computing device at a home location, versus interacting at a public location, where a higher confidence level is more secure.

Together, the three factors, namely having possession of the device, performing specific activities, and recognizing that the current interaction pattern data aligns well with prior (known) interaction pattern data maintained for the user, create a layered and secure authentication system. The framework 770 thus operates to ensure that the user is authenticated not only by what they possess (the ring), but also by what the user is currently doing, and what the system knows about the user's behavior, making it difficult for unauthorized users to gain access.

Figure 8:
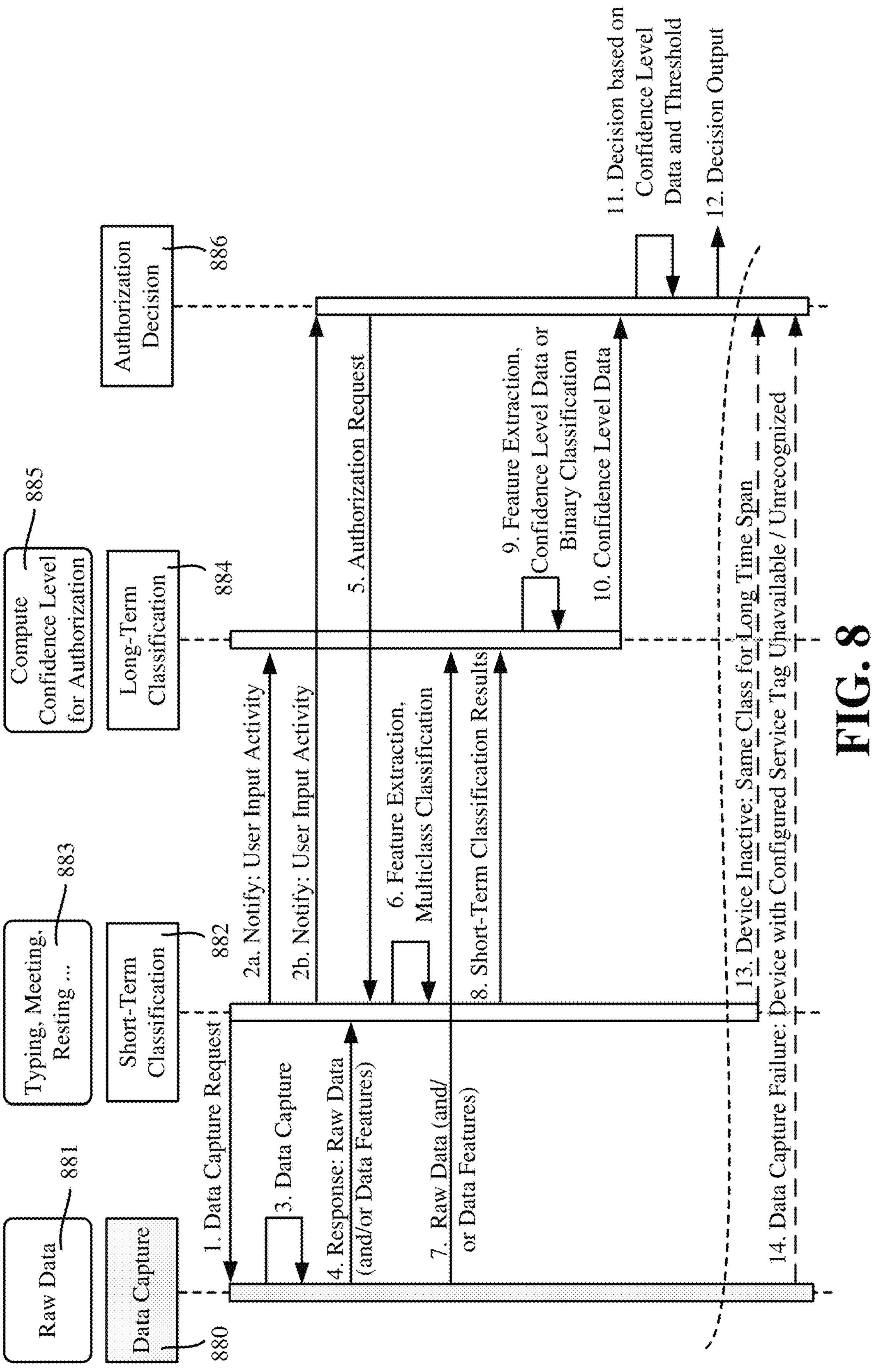
FIG. 8 is a sequence diagram representation of example dataflow/operations of models and components with respect to long-term pattern recognition of user interaction pattern data, based on short-term interaction pattern data activity/behavior classification, for a security application in which an authorization decision of the user is requested, in accordance with various example embodiments and implementations of the subject disclosure.

A sequence diagram of the proposed additional security layering based on long-term user interaction pattern, which can avoid the need for explicit user identity authentication input (such as a password/fingerprint/facial recognition), is shown in FIG. 8. More particularly, the sequence diagram of FIG. 8 outlines an authentication process that leverages the multi-factor authentication framework 770 of FIG. 7 based on (at least) the above three factors, each of which corresponds to different stages in the authentication process, involving data capture (block 880), short-term classification (via model set 882), long-term classification (via model set 884), and final authorization decision-making (block 886).

The authentication process begins with the data capture stage (block 880), where raw signal data 881 is collected from the user. In this example, the system, e.g., via detection of some amount of user interaction coupled to the short term classification 882 (or another program coupled thereto), requests the raw data capture as represented in FIG. 8 via labeled arrow (1). As set forth herein, the raw signal data 881 is collected from a device that is configured with a specific service tag, ensuring that the user has possession of the correct physical object (e.g., a uniquely manufactured ring). The possession factor is satisfied when the user possesses the configured device; if the device is unavailable or incorrectly configured (or not recognized as matching one associated with the user), a data capture failure occurs, and the authentication process based on user interaction pattern data cannot proceed (arrow (14)). Note that another type of authentication process, such as password input, fingerprint input, and so on may be used in such an event.

In this example, while data capture is occurring as represented by arrow (3), other components of the system may be notified/loaded into memory for execution, including a long term classification model set (block 884, arrow (2*a*)) and an authorization decision component (block 886, arrow (2*b*)).

Short-term classification occurs after successful data capture, in which the raw signal data 881, as well as possibly preprocessed data corresponding to the raw data, such as FFT images, which may be further preprocessed into feature data, is passed to a short-term classification model set, block 882 (arrow 4) for processing and classification; (note that some or all of the preprocessing can occur as part of the short term classification operations). In this example, classification begins in response to an authorization request (arrow (5)) from the authorization decision component 886, although in alternative configurations, the short term classification can be automatic, and trigger the authorization decision, such as in a system that regularly monitors user input activity as part of ongoing user authentication.

The short-term classification model set 882 processes the data/data features to classify the user's immediate activities, such as currently typing, meeting, or resting (block 883). The classification is typically a multi-class process, although it can also perform binary classification depending on a given application, e.g., whether typing or not, yes/no. The second factor is associated with the short-term classification of the user interaction into activity/behavior class in this stage, where the system verifies whether the user is performing a known and expected activity. This helps to confirm the user's behavior and detect any anomalies. If the device is inactive for a long period (e.g., the same activity is detected continuously), the system may adjust its monitoring strategy accordingly (e.g., arrow (13)).

After short term classification, the raw/featurized data, along with the activity classification results from short-term classification, are input into a long-term classification model set (block 884, arrows (7) and (8)). The long-term classification model set 884, possibly with additional feature extraction, computes authentication response data (arrow (9)), such as a confidence level for authorization, by analyzing the patterns over a longer period and comparing them against known behavior patterns of the authorized user, e.g., maintained and/or used to train the model set 884. The third factor is validated in this stage, which ensures that the user's current behavior aligns with the stored patterns of the authorized user. In one implementation, the decision to authorize access is made based on a computed confidence level, which takes into account the threshold set for authentication. Note that alternatively, the classification can be binary, e.g., authenticated or not authenticated.

In this example, an authorization decision is made based on the computed confidence level provided to the authorization decision component 886 via arrow (10). That is, based on the results from the long-term classification/the computed confidence level data, an authorization decision is made (arrow (11)). If the user's behavior and device possession satisfy the three authentication states, access is granted (arrow (12)), or continues to be granted if ongoing monitoring/authentication is taking place. If any of the factors do not meet the defined threshold, the authorization request may be denied, ensuring that only legitimate users are granted access. If not authorized via the operations of FIG. 8 (implementing the framework 770 of FIG. 7), some action may be taken by the system, such as to output a security alert, and/or to request credentials in some other manner.

In one implementation, a multi-modal machine learning (ML) classifier integrates features extracted from time and frequency domain analyses of the reflected user interaction-related signals, which in conjunction with a long term model, can recognize habitual patterns of a user and detect any deviations from the user's ordinary interaction behavior, which can indicate a different user. One usage for the interaction pattern analysis is for regular, ongoing authentication rather than a one-time initial check, providing increased security by more frequently verifying a user's identity based on the user's real-time interaction patterns. If deviations from a user's typical interaction behavior are detected, the system can generate additional authentication requests, thereby enhancing security. Threshold filtering on the received signals can be used to reduce the amount of input data, as well as capture more meaningful interaction data.

An artificial intelligence (AI) learning engine can combine user behavior patterns with contextual factors like location, with can be used to dynamically adjust a security confidence level. For instance, the security confidence level with respect to sensed interaction pattern is higher at a user's home location (and thus can have a lower defined threshold level to satisfy), and lower in a public space like a cafeteria (and thus can have a higher defined threshold level to satisfy). This dynamic and personalized approach strengthens security protocols within a zero-trust framework, while adapting to individual behavior and environmental context in a non-intrusive manner, thereby enhancing the overall user experience. To summarize, security in terms of authentication and usability is enriched with the integration of intelligent and responsive peripherals and their associated computing devices.

Figure 9:
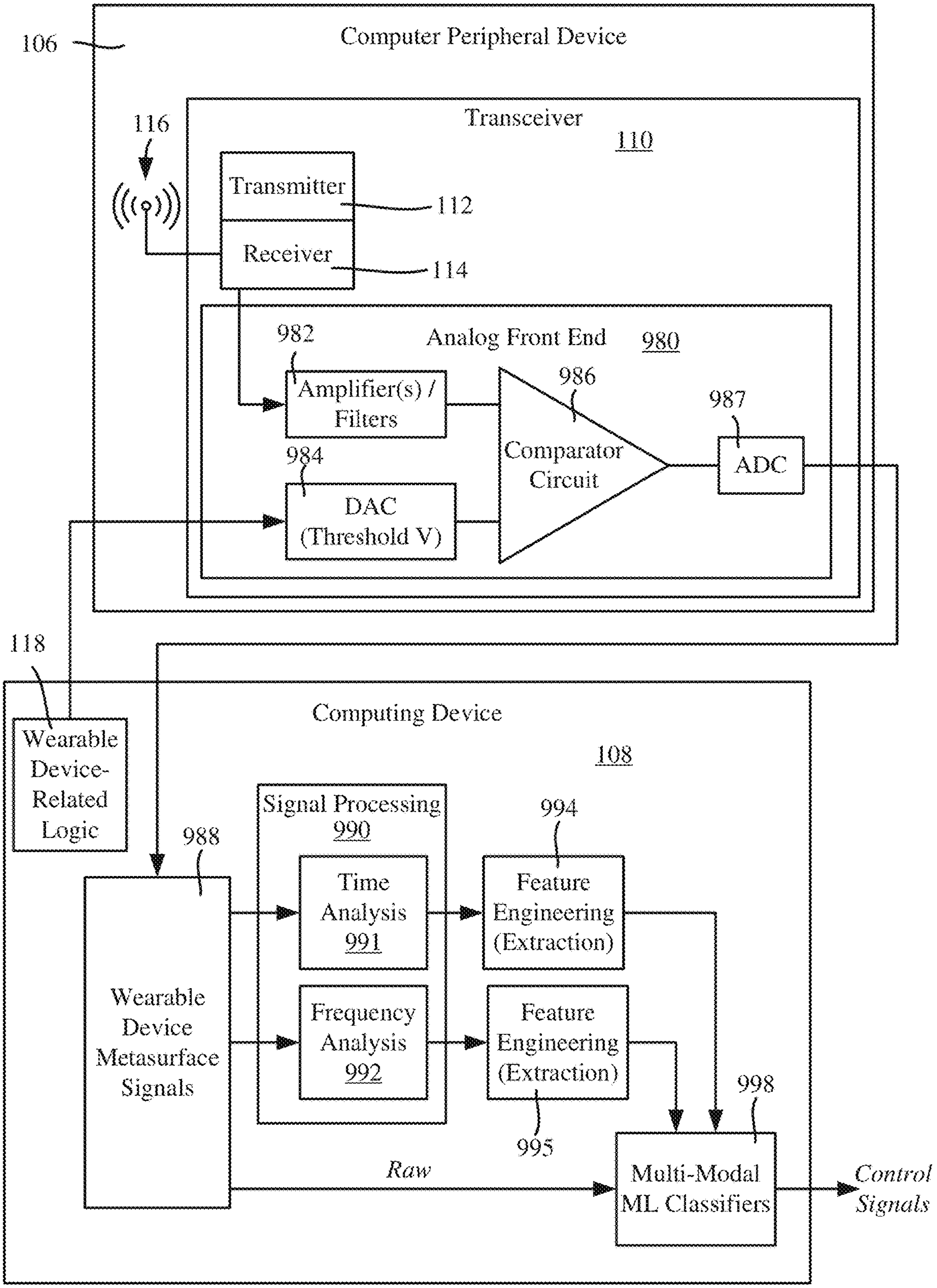
FIG. 9 is a flow diagram showing example operations related to obtaining behavior classification data from a trained model set, based on user interaction pattern data, indicative of a current user activity with respect to a computing device, in accordance with various example embodiments and implementations of the subject disclosure.
Figure 10:
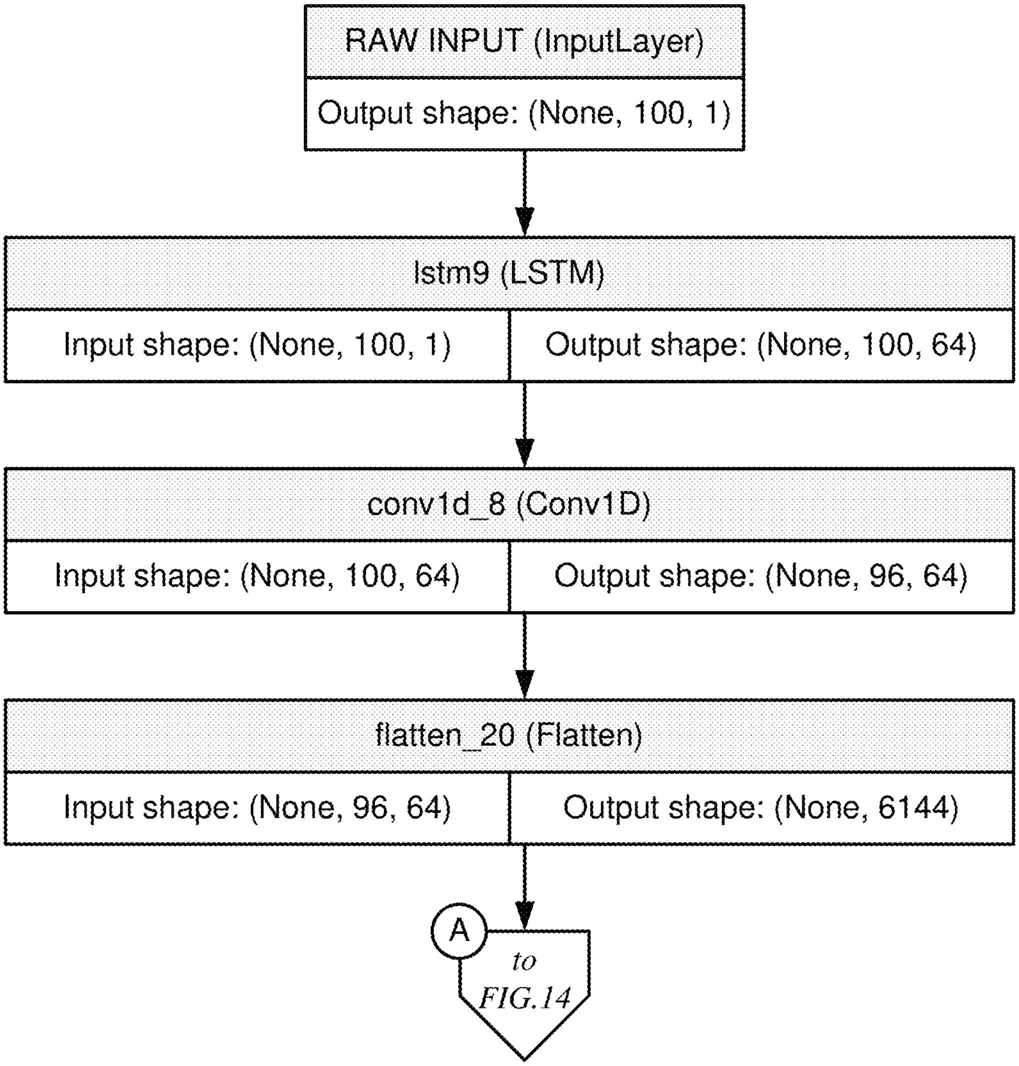
FIGS. 10, 11, 12, 13 and 14 comprise a representation of a multi-modal machine learning (ML) classifier architecture, in accordance with various example embodiments and implementations of the subject disclosure.
Figure 11:
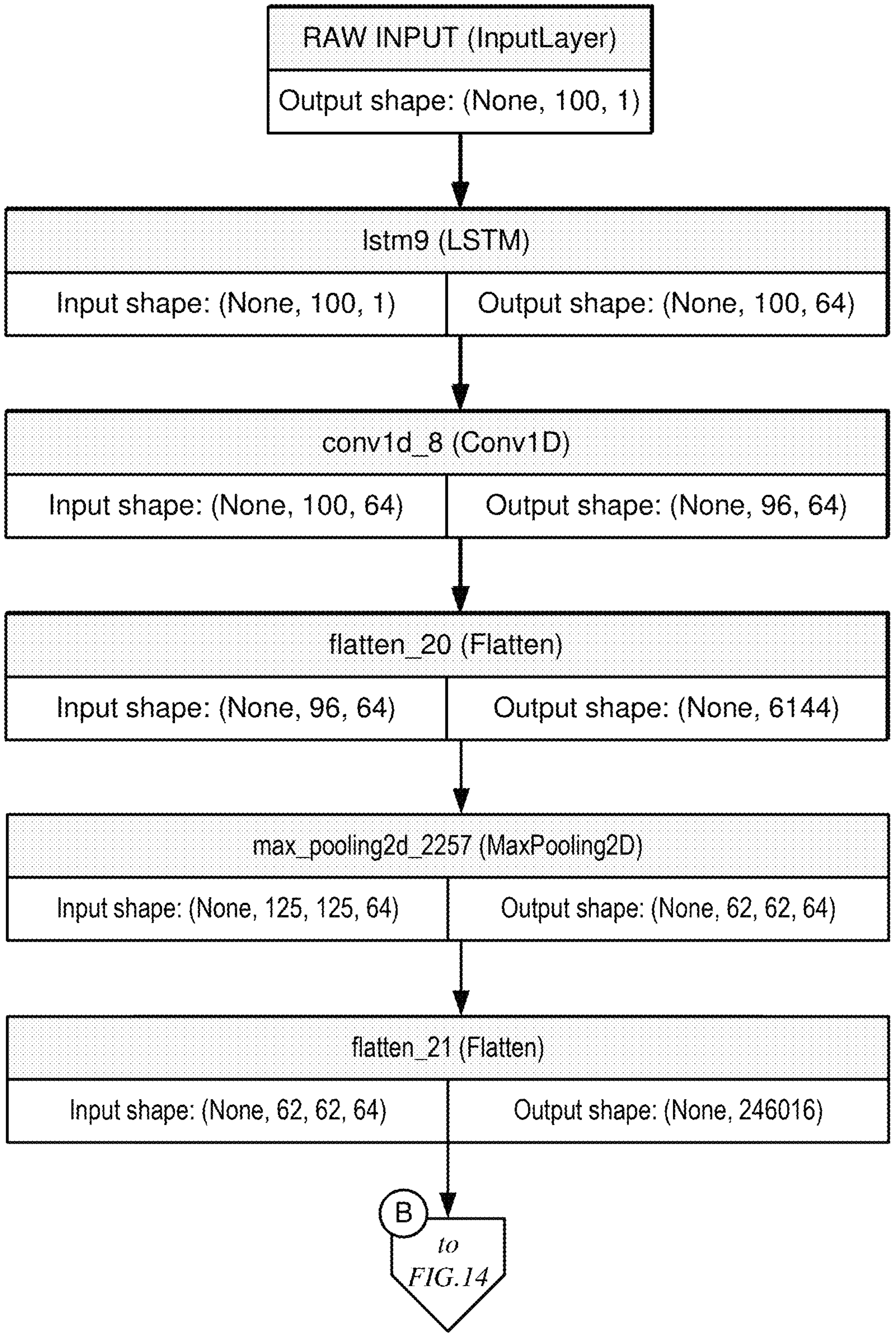
Figure 12:
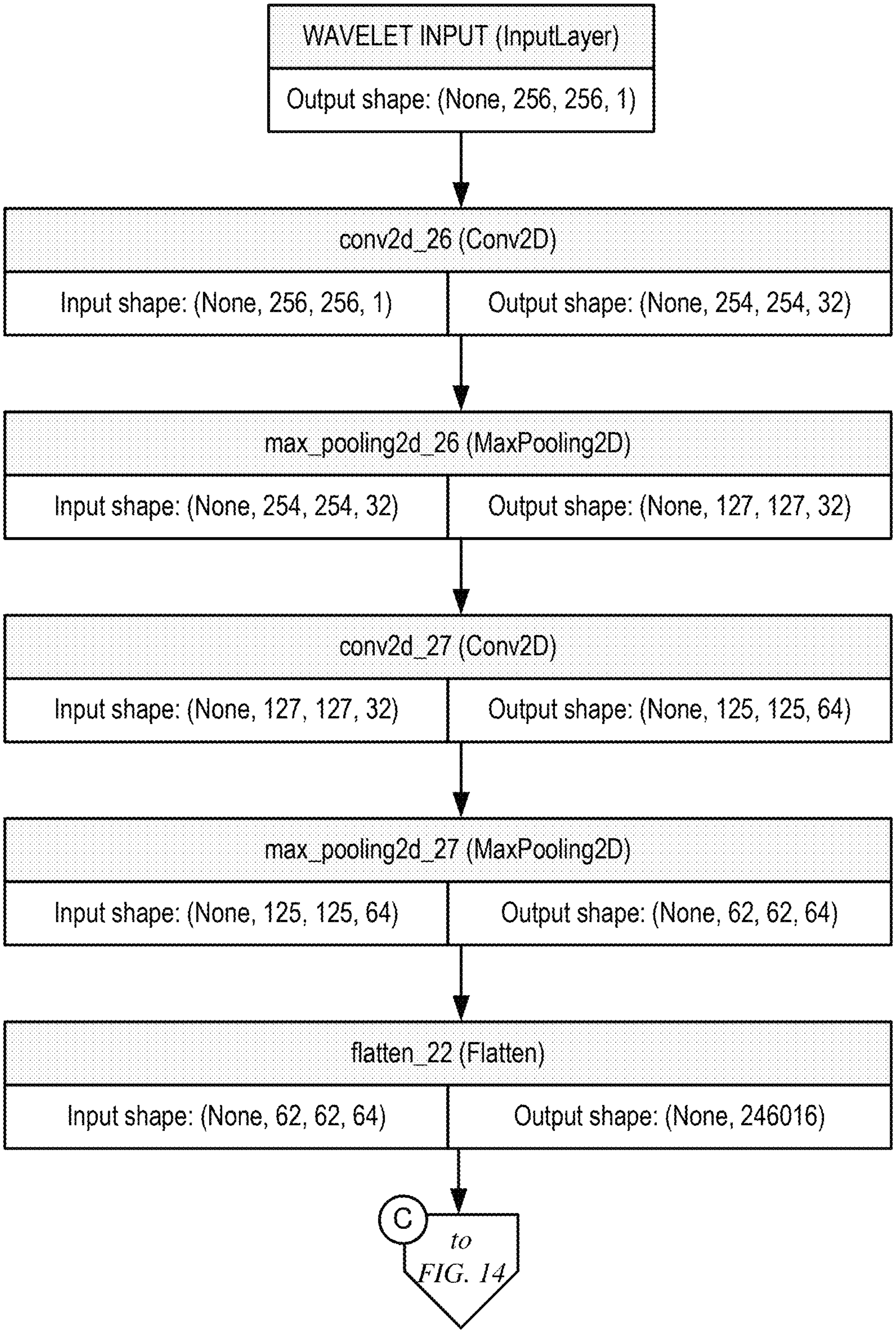
Figure 13:
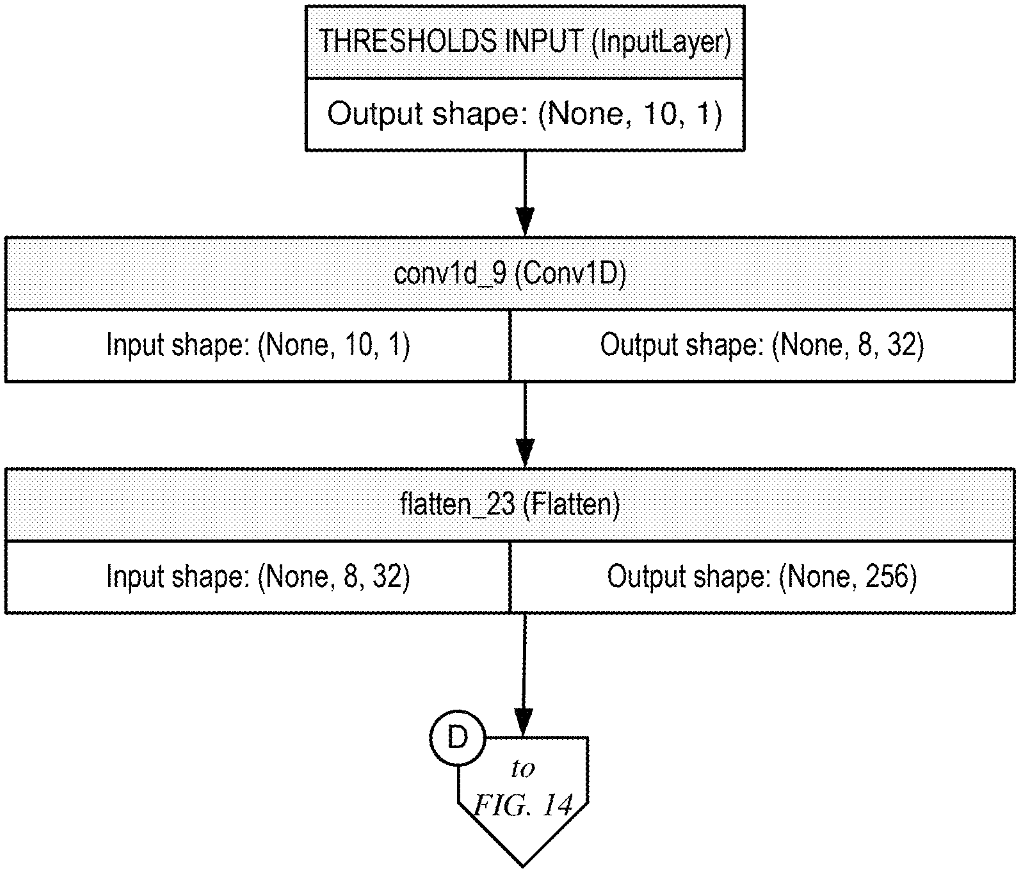

Additional example hardware implementation details are shown in FIG. 9. As described with reference to FIG. 1A, the transceiver 110 in the computer peripheral device 106 (e.g., keyboard) sends and receives signals via an antenna 116 that emits monitoring signals (transmitter block 112). The metasurface, e.g., incorporated into the ring on the user's hand, reflects the signals, and the antenna 116 and receiver (block 114) captures the reflected signals from the metasurface. As described herein, these reflected signals vary based on the user's movements and interactions with the keyboard and/or mouse.

An analog front end 980 in the transceiver 110 includes one or more amplifier(s)/filter(s) (block 982), and analog-to-digital converter(s) (ADC) 984. A comparator circuit 986 can is used to implement threshold detection, e.g., such that only significant interaction is captured; if implemented, the comparator circuit 986 compares the signal amplitude against a predefined threshold level. The threshold level is set using a digital-to-analog converter (DAC) 987 that generates a reference voltage (e.g., as set by the wearable device-related logic 118 in the computing device 108). The reference voltage represents the threshold level. Data points that exceed the threshold are stored temporarily and transmitted to the system AI model for behavioral analysis. Hardware-based filtering allows for real-time processing and virtually immediate responses to significant user activities. Implementing threshold filtering in hardware reduces the power consumption compared to processing the data in software.

Because the system may operate continuously, it is designed for low power consumption. Power management involves implementing sleep and wake modes to save power when the system is idle. The system can wake up and start processing when significant activity is detected.

FIG. 9 also shows the processing workflow and subsystems for analyzing user activity data from the metasurface based on the signals 988 (based on those signals exceeding the threshold voltage) from the analog front end 980, and includes a signal processing subsystem 990 (time analysis 991 and frequency analysis 992), feature engineering (blocks 994 and 995), and the short term and long term machine learning (ML) classifiers 998 (corresponding to the model sets 882 and 884, respectively of (FIG. 8). The signal processing subsystem 990 includes subjecting the raw data to time domain analysis and frequency domain analysis. This dual-domain approach ensures that transient and continuous features are considered for more accurate behavior modeling. Parallel processing can be used to allow the system to operate in real-time, providing virtually immediate feedback based on user activity. Feature engineering (blocks 994 and 995) in both time and frequency domains extract rich, informative features useful for a high-precision ML model. These features are fed into the multi-modal machine learning (ML) classifier 998. The classifier model 998 categorizes the user's activity and generates control signals for various purposes, such as user authentication and/or adaptive security measures. For instance, detecting unusual activity patterns can prompt additional authentication, or trigger security alerts, enhancing the overall security of the system.

FIGS. 10-14 represent one example multi-modal ML classifier architecture that is designed to enhance user authentication by integrating various data modalities, including raw signal data, fast Fourier transform (FFT) spectrum images, wavelet spectrum images, and threshold-based features. Each modality is processed through specific branches; the time series data is handled (FIG. 10) by a combination of long-short-term memory (LSTM) and 1D convolutional layers to extract temporal and localized features effectively. The FFT spectrum, now treated as an image, is processed (FIG. 11) through a sequence of 2D convolutional and pooling layers to capture spatial-frequency patterns. Similarly, the wavelet spectrum images are processed (FIG. 12) through another set of 2D convolutional and pooling layers.

Figure 14:
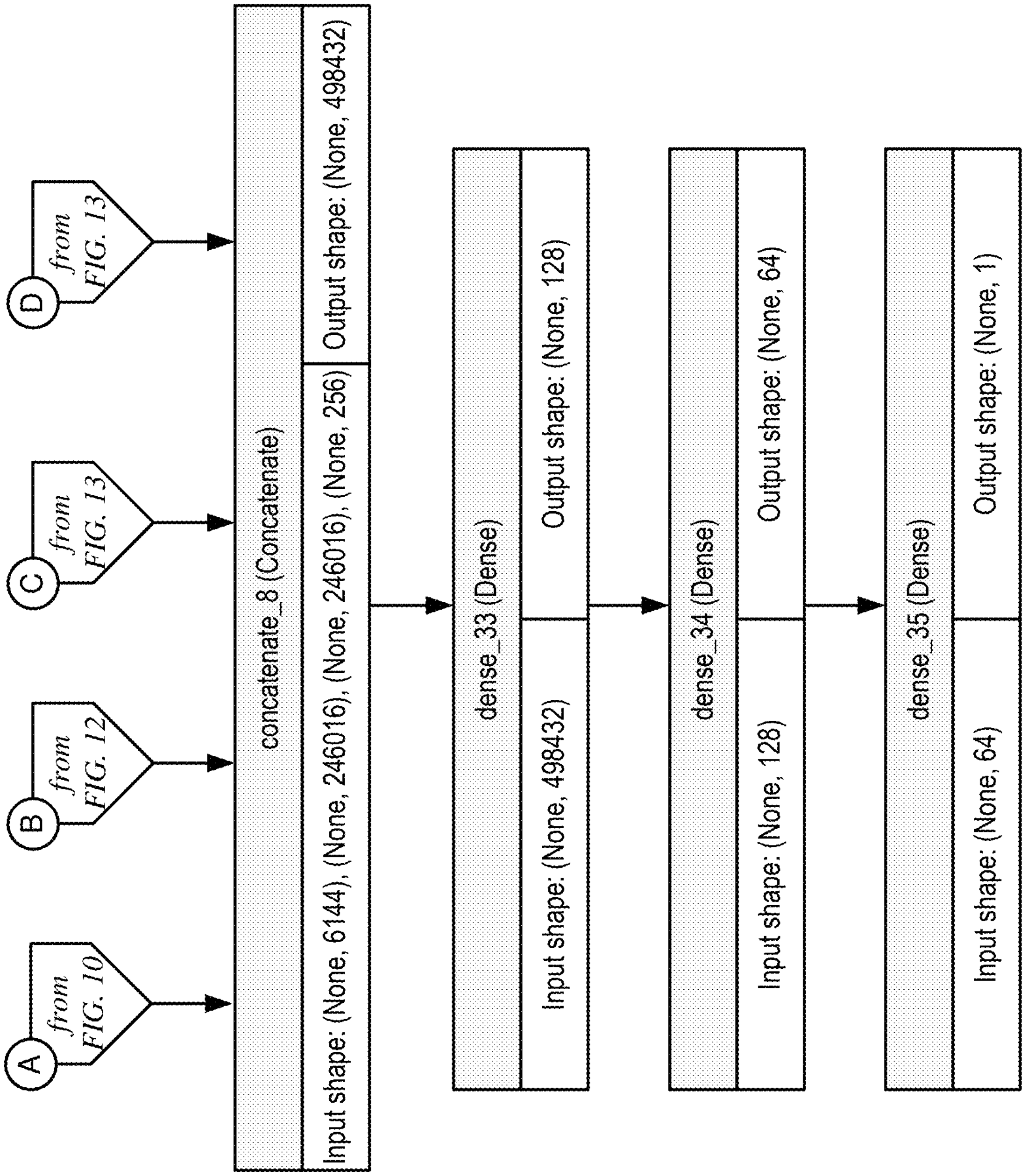

For the threshold-based features, a 1D convolutional approach (FIG. 13) is utilized to capture relationships within the data. As shown in FIG. 14, the outputs from these branches are then concatenated and fed through dense layers to integrate the extracted features, allowing the model to make informed authentication decisions based on a comprehensive analysis of all input types. This architecture leverages the strengths of each data type but also facilitates a deeper understanding of inter-modal dynamics, for improving the reliability and accuracy of the authentication process.

Figure 15:
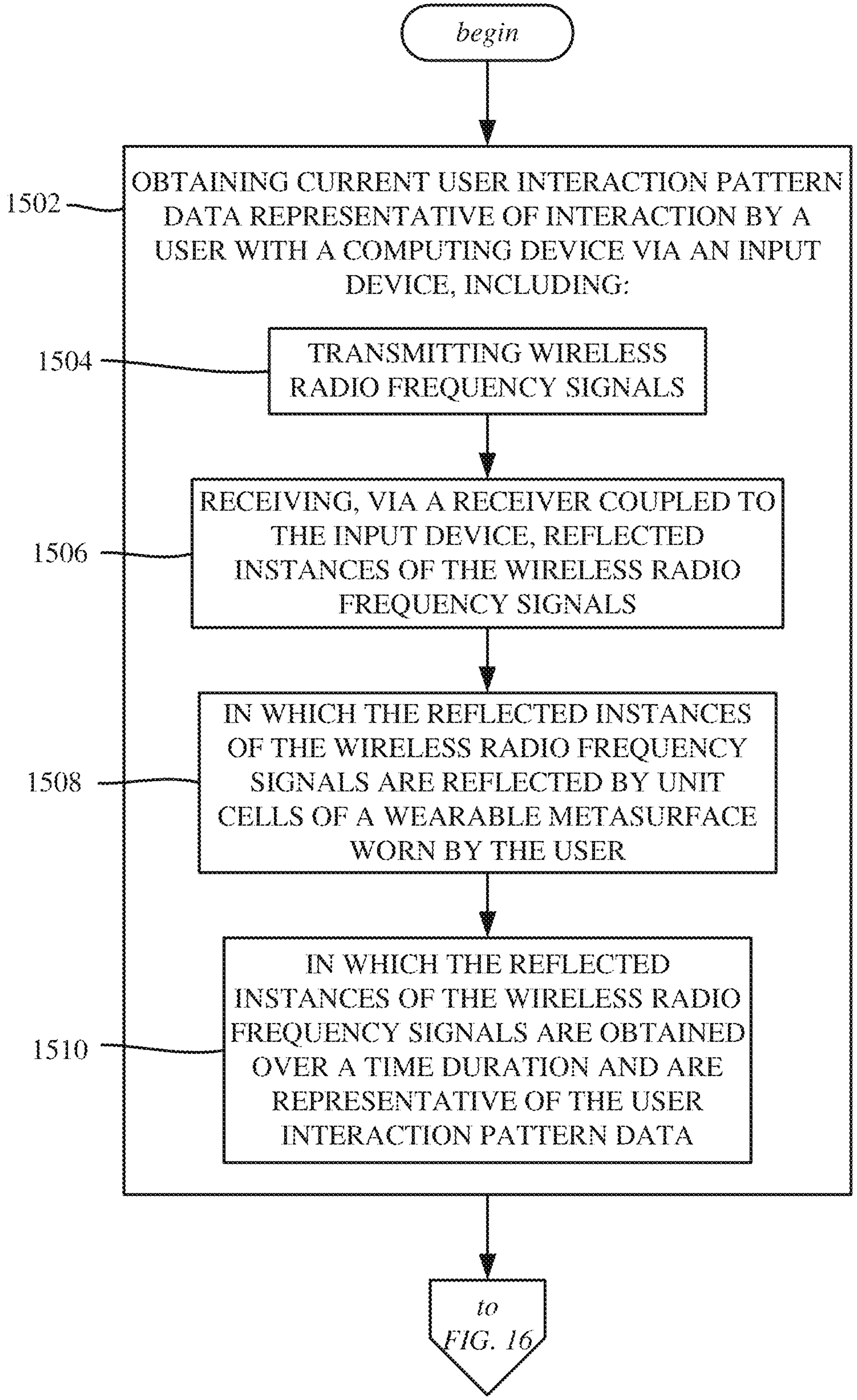
FIGS. 15 and 16 comprise a flow diagram showing example operations related to obtaining user interaction pattern data reflected from a wearable metasurface to determine, based on the user interaction patten data, whether the user is an authorized user of a computing device, in accordance with various example embodiments and implementations of the subject disclosure.
Figure 16:
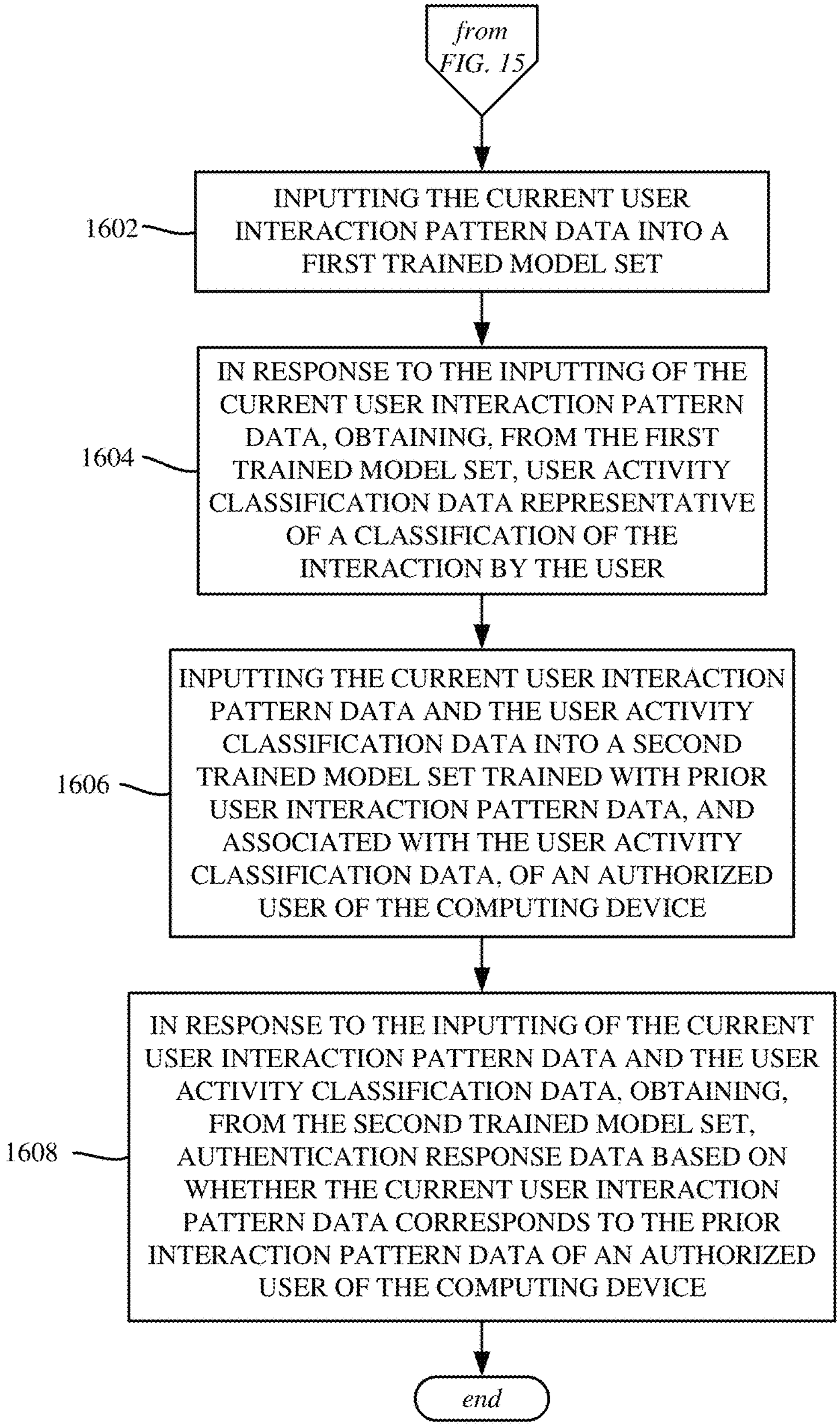

One or more implementations can be embodied in a system, such as represented in the example operations of FIGS. 15 and 16, and for example can include at least one processor memory that stores computer executable components and/or operations, and at least one processor that executes computer executable components and/or operations stored in the memory. Example operations can include operation 1502 of FIG. 15, which represents obtaining current user interaction pattern data representative of interaction by a user with a computing device via an input device, which can include example operations 1504, 1506, 1508 and 1510. Example operation 1504 represents transmitting wireless radio frequency signals. Example operation 1506 represents receiving, via a receiver coupled to the input device, reflected instances of the wireless radio frequency signals. Example operation 1508 represents that the reflected instances of the wireless radio frequency signals are reflected by unit cells of a wearable metasurface worn by the user. Example operation 1510 represents that the reflected instances of the wireless radio frequency signals are obtained over a time duration and are representative of the user interaction pattern data. The example operations continue at operation 1602 of FIG. 16, which represents inputting the current user interaction pattern data into a first trained model set. Example operation 1604 represents, in response to the inputting of the current user interaction pattern data, obtaining, from the first trained model set, user activity classification data representative of a classification of the interaction by the user. Example operation 1606 represents inputting the current user interaction pattern data and the user activity classification data into a second trained model set trained with prior user interaction pattern data, and associated with the user activity classification data, of an authorized user of the computing device. Example operation 1608 represents, in response to the inputting of the current user interaction pattern data and the user activity classification data, obtaining, from the second trained model set, authentication response data based on whether the current user interaction pattern data corresponds to the prior interaction pattern data of an authorized user of the computing device.

The first trained model set can include a short term multi-class classification model, and the second trained model set can include a long-term classification model.

The authentication response data can include confidence level data representative of a likelihood that the user can be authorized to use the computing device.

The authentication response data can include confidence level data, and further operations can include determining, based on whether the confidence level data satisfies defined confidence threshold data, whether the user can be authorized to use the computing device.

The current user interaction pattern data can be representative of: keyboard interaction by the user, pointing device interaction by the user, resting by the user, or attending a meeting by the user.

The wearable metasurface can be incorporated into a ring designed to be worn on a finger of the user.

The input device can include at least one: of a pointing device or a keyboard.

The authentication response data does not indicate that the user can be authorized to use the computing device, and further operations can include at least one of: taking an action to authenticate a user identity associated with the user, or outputting a security alert.

The current user interaction pattern data can include at least one of: raw signal data representative of at least one raw signal representative of the interaction, fast Fourier transform spectrum image data representative of at least one fast Fourier transform spectrum image representative of the interaction, wavelet spectrum image data representative of at least one wavelet spectrum image representative of the interaction, or threshold-based feature data representative of at least one feature representative of the interaction that satisfies at least one defined threshold.

At least some of the user activity classification data can include fast Fourier transform spectrum image data.

Obtaining the current user interaction can include preprocessing the raw signal into feature data representative of the raw signal data.

The first trained model set can include at least one of: a convolutional neural network model, or a long short-term memory-based recurrent neural network.

The second trained model set can include at least one of: a convolutional neural network model, or a long short-term memory-based recurrent neural network.

Figure 17:
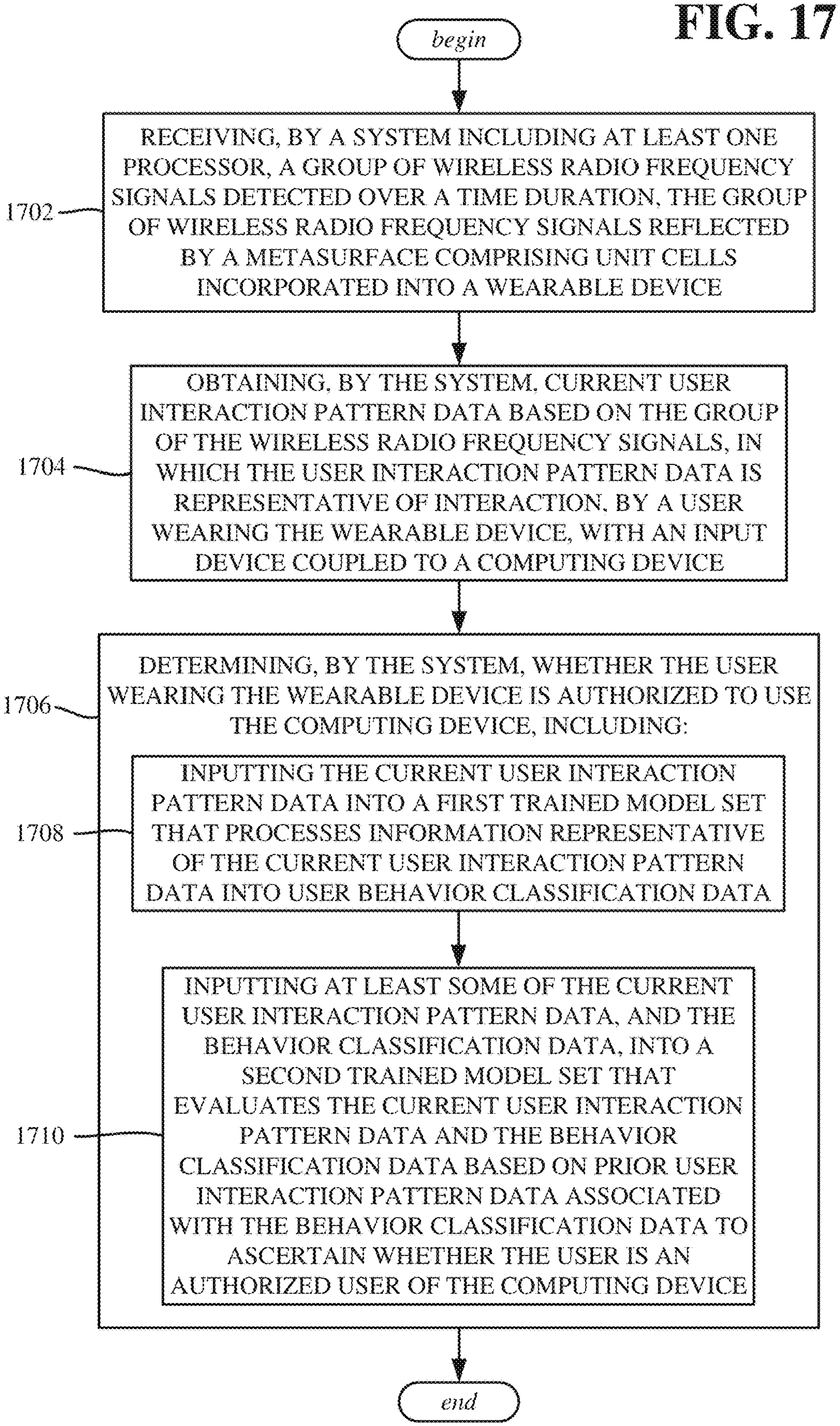
FIG. 17 is a flow diagram showing example operations related to inputting user interaction pattern data reflected from a wearable metasurface into two trained model sets to ascertain whether the user is an authorized user of a computing device, in accordance with various example embodiments and implementations of the subject disclosure.

One or more example embodiments and/or implementations, such as corresponding to example operations of a method, can be represented in FIG. 17. Example operation 1702 represents receiving, by a system including at least one processor, a group of wireless radio frequency signals detected over a time duration, the group of wireless radio frequency signals reflected by a metasurface comprising unit cells incorporated into a wearable device. Example operation 1704 represents obtaining, by the system, current user interaction pattern data based on the group of the wireless radio frequency signals, in which the user interaction pattern data can be representative of interaction, by a user wearing the wearable device, with an input device coupled to a computing device. Example operation 1706 represents determining, by the system, whether the user wearing the wearable device is authorized to use the computing device, which can include example operations 1708 and 1710. Example operation 1708 represents inputting the current user interaction pattern data into a first trained model set that processes information representative of the current user interaction pattern data into user behavior classification data. Example operation 1710 represents inputting at least some of the current user interaction pattern data, and the behavior classification data, into a second trained model set that evaluates the current user interaction pattern data and the behavior classification data based on prior user interaction pattern data associated with the behavior classification data to ascertain whether the user is an authorized user of the computing device.

Determining whether the user wearing the wearable device is authorized to use the computing device can include determining, from at least some of the wireless radio frequency signals of the group, that the metasurface corresponds to a recognized wearable device.

Inputting the at least some of the current user interaction pattern data and the behavior classification data into the second trained model set can result in obtaining, by the system, confidence level data from the second trained model set; the confidence level data can be representative of a likelihood that the user can be authorized to use the computing device, and further operations can include determining, by the system based on the confidence level data and defined confidence level threshold data, that the user is the authorized user of the computing device.

Inputting the at least some of the current user interaction pattern data and the behavior classification data into the second trained model set can result in obtaining, by the system, confidence level data from the second trained model set; the confidence level data can be representative of a likelihood that the user is authorized to use the computing device, and further operations can include determining, by the system based on the confidence level data and defined confidence level threshold data, that the user is likely not an authorized user of the computing device, and taking an action, by the system, to authenticate a user identity associated with the user, or to output a security alert.

Figure 18:
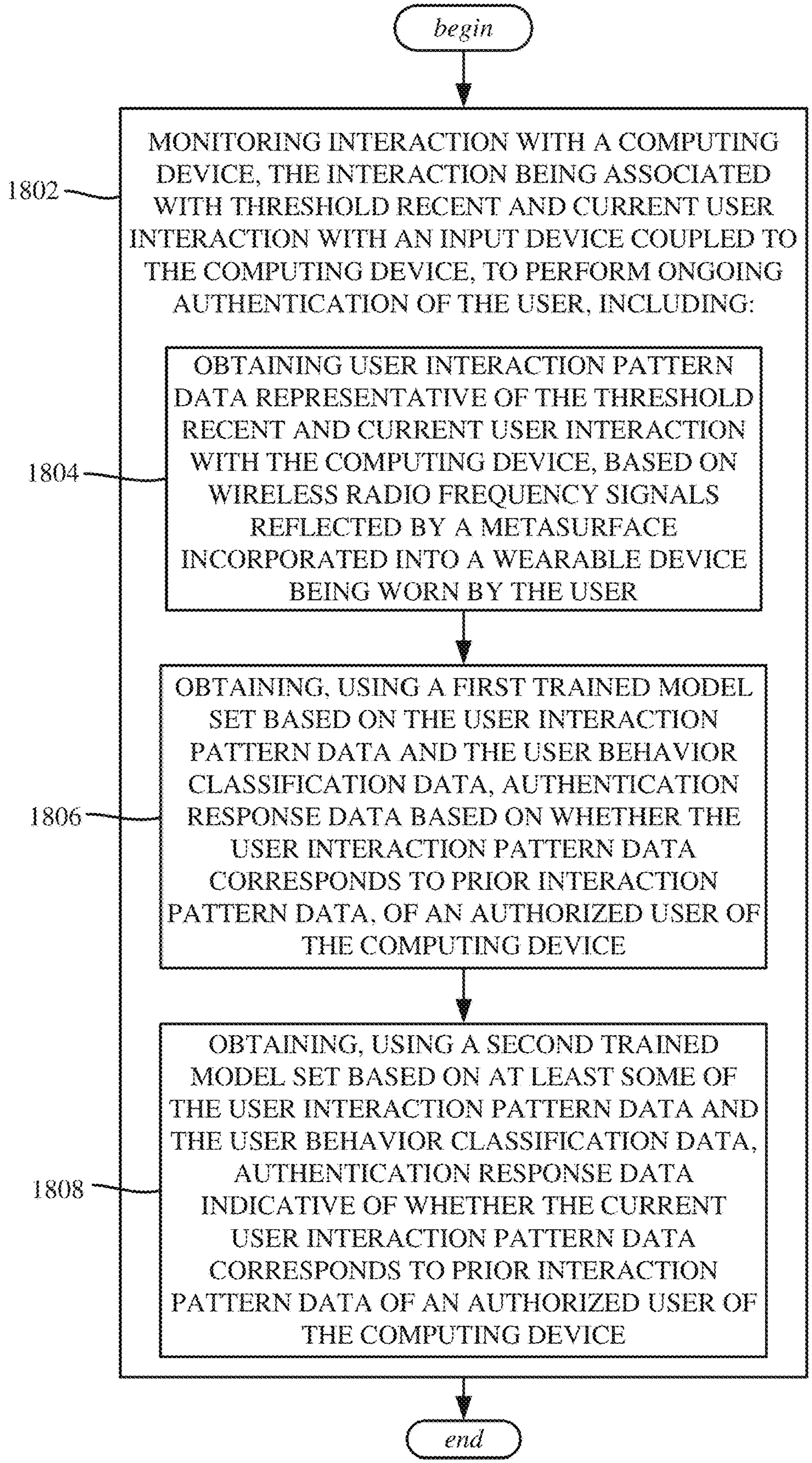
FIG. 18 is a flow diagram showing example operations related to monitoring interaction with a computing device to perform ongoing authentication of a user, based on trained model sets determining from user interaction pattern data whether the is user authorized to use the computing device, in accordance with various example embodiments and implementations of the subject disclosure.

FIG. 18 summarizes various example operations, e.g., corresponding to a machine-readable medium, including executable instructions that, when executed by a processor of a target cluster, facilitate performance of operations. Example operation 1802 represents monitoring interaction with a computing device, the interaction being associated with threshold recent and current user interaction with an input device coupled to the computing device, to perform ongoing authentication of the user. Monitoring can include example operations 1804, 1806 and 1808. Example operation 1804 represents obtaining user interaction pattern data representative of the threshold recent and current user interaction with the computing device, based on wireless radio frequency signals reflected by a metasurface incorporated into a wearable device being worn by the user. Example operation 1806 represents obtaining, using a first trained model set based on the user interaction pattern data and the user behavior classification data, authentication response data based on whether the user interaction pattern data corresponds to prior interaction pattern data, of an authorized user of the computing device. Example operation 1808 represents obtaining, using a second trained model set based on at least some of the user interaction pattern data and the user behavior classification data, authentication response data indicative of whether the current user interaction pattern data corresponds to prior interaction pattern data of an authorized user of the computing device.

The authentication response data can include confidence level data representative of a likelihood that the user is authorized to use the computing device, and further operations can include determining, based on the confidence level data and defined confidence level threshold data, that the user is an authorized user of the computing device.

The authentication response data can include confidence level data representative of a likelihood that the user is authorized to use the computing device, and further operations can include determining, based on the confidence level data and defined confidence level threshold data, that the user can be potentially not authorized to use the computing device, and taking an action based on the user being potentially not authorized to use the computing device.

As can be seen, the technology described herein includes a short-term data classification model set that classifies user computing device interaction behavior into categories such as typing, meeting, resting, and so on, along with a long term classification model set that evaluates the user interaction pattern data based on prior data collected for an authorized user of the computing device. The technology leverages a passive wearable metasurface to enable virtually continuous, non-intrusive user authentication by detecting and verifying unique interaction patterns without requiring explicit user input. The data from the passive metasurface is combined with short-term pattern recognition to dynamically adjust authentication processes based on real-time user activities, providing a context-aware security approach. FFTs are used for feature extraction in the frequency domain, facilitating more accurate classification of subtle variations in user activities, thereby enhancing the reliability of the pattern recognition process.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining current user interaction pattern data representative of interaction by a user with a computing device via an input device, comprising:

transmitting wireless radio frequency signals;

receiving, via a receiver coupled to the input device, reflected instances of the wireless radio frequency signals, wherein the reflected instances of the wireless radio frequency signals are reflected by unit cells of a wearable metasurface worn by the user, and wherein the reflected instances of the wireless radio frequency signals are obtained over a time duration and are representative of the user interaction pattern data;

inputting the current user interaction pattern data into a first trained model set;

in response to the inputting of the current user interaction pattern data, obtaining, from the first trained model set, user activity classification data representative of a classification of the interaction by the user;

inputting the current user interaction pattern data and the user activity classification data into a second trained model set trained with prior user interaction pattern data, and associated with the user activity classification data, of an authorized user of the computing device; and in response to the inputting of the current user interaction pattern data and the user activity classification data, obtaining, from the second trained model set, authentication response data based on whether the current user interaction pattern data corresponds to the prior interaction pattern data of an authorized user of the computing device.

2. The system of claim 1, wherein the first trained model set comprises a short term multi-class classification model, and wherein the second trained model set comprises a long-term classification model.

3. The system of claim 1, wherein the authentication response data comprises confidence level data representative of a likelihood that the user is authorized to use the computing device.

4. The system of claim 1, wherein the authentication response data comprises confidence level data, and wherein the operations further comprise determining, based on whether the confidence level data satisfies defined confidence threshold data, whether the user is authorized to use the computing device.

5. The system of claim 1, wherein the current user interaction pattern data is representative of: keyboard interaction by the user, pointing device interaction by the user, resting by the user, or attending a meeting by the user.

6. The system of claim 1, wherein the wearable metasurface is incorporated into a ring designed to be worn on a finger of the user.

7. The system of claim 1, wherein the input device comprises at least one: of a pointing device or a keyboard.

8. The system of claim 1, wherein the authentication response data does not indicate that the user is authorized to use the computing device, and wherein the operations further comprise at least one of: taking an action to authenticate a user identity associated with the user, or outputting a security alert.

9. The system of claim 1, wherein the current user interaction pattern data comprises at least one of: raw signal data representative of at least one raw signal representative of the interaction, fast Fourier transform spectrum image data representative of at least one fast Fourier transform spectrum image representative of the interaction, wavelet spectrum image data representative of at least one wavelet spectrum image representative of the interaction, or threshold-based feature data representative of at least one feature representative of the interaction that satisfies at least one defined threshold.

10. The system of claim 9, wherein at least some of the user activity classification data comprises fast Fourier transform spectrum image data.

11. The system of claim 9, wherein the obtaining of the current user interaction comprises preprocessing the raw signal into feature data representative of the raw signal data.

12. The system of claim 1, wherein the first trained model set comprises at least one of: a convolutional neural network model, or a long short-term memory-based recurrent neural network.

13. The system of claim 1, wherein the second trained model set comprises at least one of: a convolutional neural network model, or a long short-term memory-based recurrent neural network.

14. A method, comprising:
- receiving, by a system comprising at least one processor, a group of wireless radio frequency signals detected over a time duration, the group of wireless radio frequency signals reflected by a metasurface comprising unit cells incorporated into a wearable device;
- obtaining, by the system, current user interaction pattern data based on the group of the wireless radio frequency signals, wherein the user interaction pattern data is representative of interaction, by a user wearing the wearable device, with an input device coupled to a computing device; and
- determining, by the system, whether the user wearing the wearable device is authorized to use the computing device, comprising:
  - inputting the current user interaction pattern data into a first trained model set that processes information representative of the current user interaction pattern data into user behavior classification data,
  - inputting at least some of the current user interaction pattern data, and the behavior classification data, into a second trained model set that evaluates the current user interaction pattern data and the behavior classification data based on prior user interaction pattern data associated with the behavior classification data to ascertain whether the user is an authorized user of the computing device.

15. The method of claim 14, wherein the determining of whether the user wearing the wearable device is authorized to use the computing device comprises determining, from at least some of the wireless radio frequency signals of the group, that the metasurface corresponds to a recognized wearable device.

16. The method of claim 14, wherein the inputting of the at least some of the current user interaction pattern data and the behavior classification data into the second trained model set results in obtaining, by the system, confidence level data from the second trained model set, the confidence level data being representative of a likelihood that the user is authorized to use the computing device, and further comprising determining, by the system based on the confidence level data and defined confidence level threshold data, that the user is the authorized user of the computing device.

17. The method of claim 14, wherein the inputting of the at least some of the current user interaction pattern data and the behavior classification data into the second trained model set results in obtaining, by the system, confidence level data from the second trained model set, the confidence level data representative of a likelihood that the user is authorized to use the computing device, and further comprising:
- determining, by the system based on the confidence level data and defined confidence level threshold data, that the user is likely not an authorized user of the computing device, and
- taking an action, by the system, to authenticate a user identity associated with the user, or to output a security alert.

18. A non-transitory machine-readable medium, comprising executable instructions that, when executed by at least one processor, facilitate performance of operations, the operations comprising:
- monitoring interaction with a computing device, the interaction being associated with threshold recent and current user interaction with an input device coupled to the computing device, to perform ongoing authentication of the user, comprising:
  - obtaining user interaction pattern data representative of the threshold recent and current user interaction with the computing device, based on wireless radio frequency signals reflected by a metasurface incorporated into a wearable device being worn by the user;
  - obtaining, using a first trained model set based on the user interaction pattern data and the user behavior classification data, authentication response data based on whether the user interaction pattern data corresponds to prior interaction pattern data, of an authorized user of the computing device; and
  - obtaining, using a second trained model set based on at least some of the user interaction pattern data and the user behavior classification data, authentication response data indicative of whether the current user interaction pattern data corresponds to prior interaction pattern data of an authorized user of the computing device.

19. The non-transitory machine-readable medium of claim 18, wherein the authentication response data comprises confidence level data representative of a likelihood that the user is authorized to use the computing device, and wherein the operations further comprise determining, based on the confidence level data and defined confidence level threshold data, that the user is an authorized user of the computing device.

20. The non-transitory machine-readable medium of claim 18, wherein the authentication response data comprises confidence level data representative of a likelihood that the user is authorized to use the computing device, and wherein the operations further comprise determining, based on the confidence level data and defined confidence level threshold data, that the user is potentially not authorized to use the computing device, and taking an action based on the user being potentially not authorized to use the computing device.

* * * * *